United States Patent
Du et al.

(10) Patent No.: US 11,967,675 B2
(45) Date of Patent: *Apr. 23, 2024

(54) ELECTROLYTES FOR HIGH-VOLTAGE CATHODE MATERIALS AND OTHER APPLICATIONS

(71) Applicant: Factorial Inc., Woburn, MA (US)

(72) Inventors: Jia Du, Woburn, MA (US); Peishen Huang, Woburn, MA (US); Karlie Mellott, Woburn, MA (US); Dong Ren, Woburn, MA (US)

(73) Assignee: Factorial Inc., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/148,482

(22) Filed: Dec. 30, 2022

(65) Prior Publication Data

US 2023/0216080 A1 Jul. 6, 2023

Related U.S. Application Data

(62) Division of application No. 16/512,495, filed on Jul. 16, 2019, now Pat. No. 11,575,147.

(51) Int. Cl.
*H01M 10/0525* (2010.01)
*H01M 4/38* (2006.01)
*H01M 10/0565* (2010.01)
*H01M 10/0567* (2010.01)
*H01M 10/0569* (2010.01)

(52) U.S. Cl.
CPC ......... *H01M 10/0525* (2013.01); *H01M 4/38* (2013.01); *H01M 10/0565* (2013.01); *H01M 10/0567* (2013.01); *H01M 10/0569* (2013.01)

(58) Field of Classification Search
None
See application file for complete search history.

(56) References Cited

U.S. PATENT DOCUMENTS 11,575,147 B2 * 2/2023 Du .................... H01M 4/505
2007/0298326 A1 12/2007 Angell et al.
(Continued)

FOREIGN PATENT DOCUMENTS

WO 2019093411 A1 5/2019
WO 2019114390 6/2019

OTHER PUBLICATIONS

International Search Report and Written Opinion for Application No. PCT/US2020/041746 mailed Oct. 28, 2020.
(Continued)

*Primary Examiner* — Lucas J. O'Donnell

(57) ABSTRACT

The present invention generally relates to electrolytes for use in various electrochemical devices. In some cases, the electrolytes are relatively safe to use; for example, the electrolytes may be resistant to overheating, catching on fire, burning, exploding, etc. In some embodiments, such electrolytes may be useful for certain types of high-voltage cathode materials. In some cases, the electrolytes may include ion dissociation compounds that can dissociate tight ion pairs. Non-limiting examples of ion dissociation compounds include trialkyl phosphates, sulfones, or the like. Other aspects of the invention are generally directed to devices including such electrolytes, methods of making or using such electrolytes, kits including such electrolytes, or the like.

17 Claims, 2 Drawing Sheets

(56) References Cited

U.S. PATENT DOCUMENTS

| | | |
|---|---|---|
| 2012/0060360 A1 | 3/2012 | Liu |
| 2016/0226104 A1 | 8/2016 | Teran et al. |
| 2017/0250445 A1 | 8/2017 | Burkhardt et al. |
| 2018/0254516 A1 | 9/2018 | Han et al. |
| 2020/0266489 A1 | 8/2020 | Han et al. |

OTHER PUBLICATIONS

Wang et al. High-Concentration Trimethyl Phosphate-Based Nonflammable Electrolytes with Improved Charge—Discharge Performance of a Graphite Anode for Lithium-Ion Cells, Journal of The Electrochemical Society, 2006, 153(1): A153-A159.

Stepniak et al., Highly conductive ionic liquid based ternary polymer electrolytesobtained by in situ photopolymerisation. Electrochimica Acta, vol. 54, Issue 24, 2009, pp. 5660-5665.

Cao et al., Fire retardant, superionic solid state polymer electrolyte membranes for lithium ion batteries, Current Opinion in Chemical Engineering, vol. 15, 2017.

Fu et al., Effects of molecular complexation on phase equilibria in mixtures of urea/polyethylene glycol derivatives and electrochemical performance of urethane based polymer electrolyte membranes for solid-state lithium ion battery, Polymer, vol. 159, 2018, p. 64-74.

Zhou et al., Self-Healing Polymer Electrolytes Formed via Dual-Networks: A New Strategy for Flexible Lithium Metal Batteries, Chem. Eur. J., 2018, 24, p. 19200-19207.

\* cited by examiner

ELECTROLYTES FOR HIGH-VOLTAGE CATHODE MATERIALS AND OTHER APPLICATIONS

FIELD

The present invention generally relates to electrolytes for use in various electrochemical devices.

BACKGROUND

Accompanying the rise of energy densities of lithium-ion batteries (LIBs) and the expansions of scale, high-voltage cathode materials have been extensively developed, but are limited by the lack of appropriate electrolytes having suitable electrochemical stabilities at high oxidation potential. In addition, safety issues in lithium batteries may arise, for example, from the use of mixed flammable solvents such as carbonate/ether as solvent systems, which, when overcharged, short-circuited, over-heated, etc., can lead to serious accidents by catching on fire, burning, or even exploding, etc. Thus, appropriate electrolytes which are safe, and which have electrochemical stability at high oxidation potentials, e.g., suitable for high-voltage lithium batteries and other applications, are still needed.

SUMMARY

The present invention generally relates to electrolytes for use in various electrochemical devices. Examples of suitable electrochemical devices such as batteries, capacitors, sensors, condensers, electrochromic elements, photoelectric conversion elements, etc. In some cases, the electrolytes are relatively safe to use; for example, the electrolytes may be resistant to overheating, catching on fire, burning, exploding, etc. In some embodiments, such electrolytes may be useful for certain types of high-voltage cathode materials. Non-limiting examples of such high-voltage cathode materials include $LiNi_{0.5}Mn_{1.5}O_4$ (LNMO), $LiCoPO_4$ (LCP), layered Li—Ni—Co—Mn oxides, (NCM), layered Li—Ni—Co—Al oxides (NCA), etc. The subject matter of the present invention involves, in some cases, interrelated products, alternative solutions to a particular problem, and/or a plurality of different uses of one or more systems and/or articles.

In one aspect, the present disclosure generally relates to various electrolytes based on ion dissociation compounds. As discussed herein, an ion dissociation compound can include any organic compound which can dissociate tight ion pairs. In some embodiments, the ion dissociation compound may also be able to chemically complex to an ion dissociated from the tight ion pair. In some embodiments, the ion dissociation compounds can be flame retardant. Non-limiting examples of ion dissociation compounds include trialkyl phosphates, sulfones, analogs of sulfone, or the like. Additional examples are also discussed below. In one embodiment, the present invention is generally directed to an electrolyte. In one set of embodiments, the electrolyte comprises a lithium salt, an ion dissociation compound, and a polymer. In some cases, the polymer comprises a product of a crosslinking reaction including a polymer selected from the group consisting of:

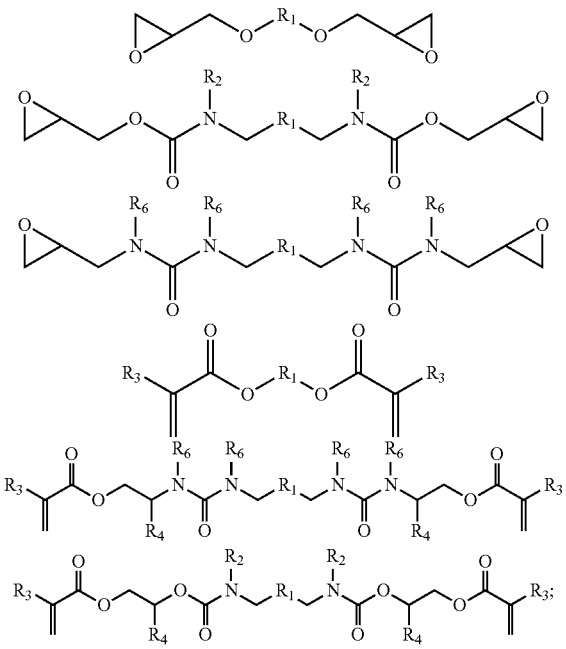

where $R_1$ comprises a structure selected from the group consisting of:

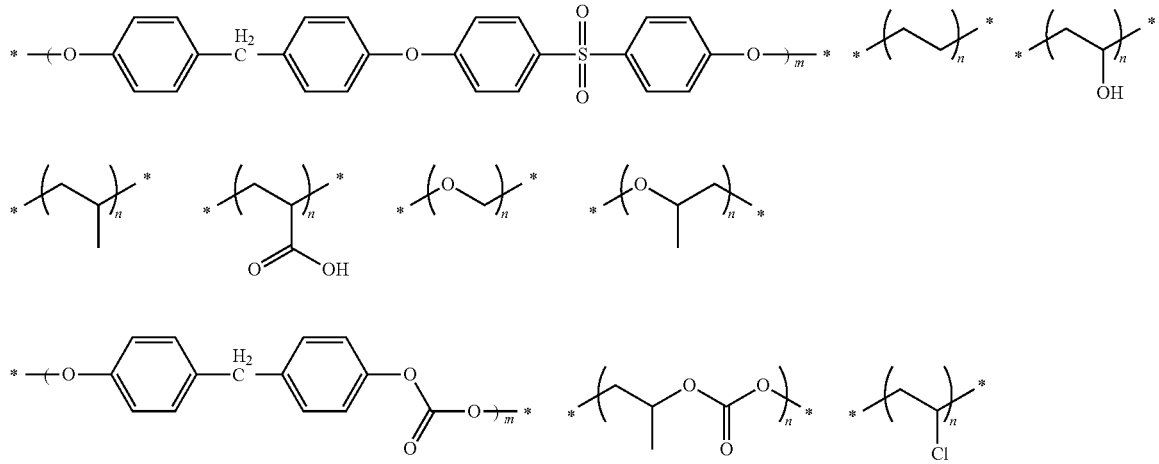

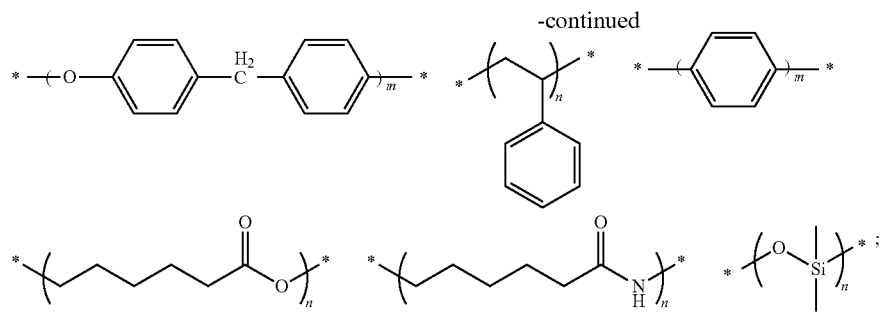

where n is an integer between 1 and 10,000, inclusive; where m is an integer between 1 and 5,000, inclusive; where $R_2$, $R_3$, $R_4$, $R_5$, and $R_6$ are each independently selected from the group consisting of:

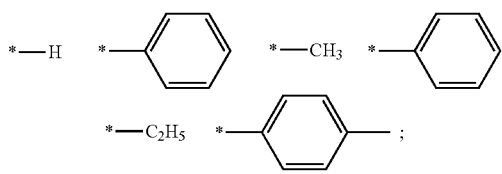

and where * indicates a point of attachment.

In another aspect, the present invention is generally directed to a method of making a device. In one set of embodiments, the method comprises mixing a liquid electrolyte and a polymer precursor into a cell, the liquid electrolyte comprising a lithium salt and an ion dissociation compound, and solidifying the liquid electrolyte within the cell to form a solid electrolyte. In some cases, the polymer precursor comprises a structure selected from the group consisting of:

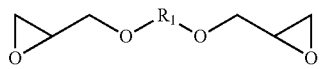

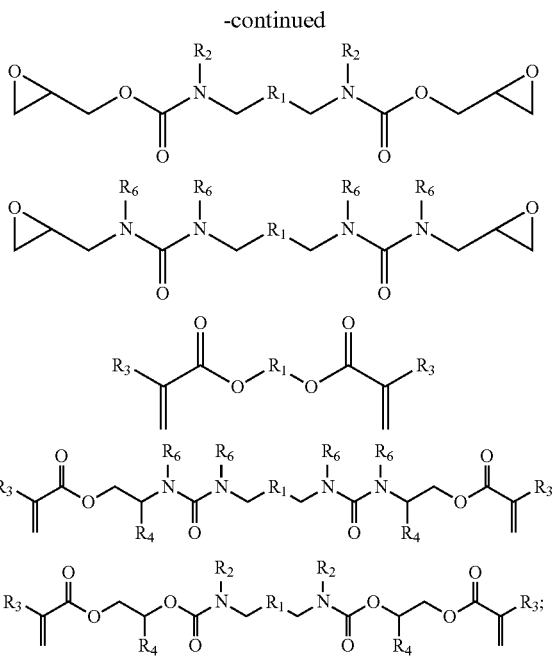

wherein $R_1$ comprises a structure selected from the group consisting of:

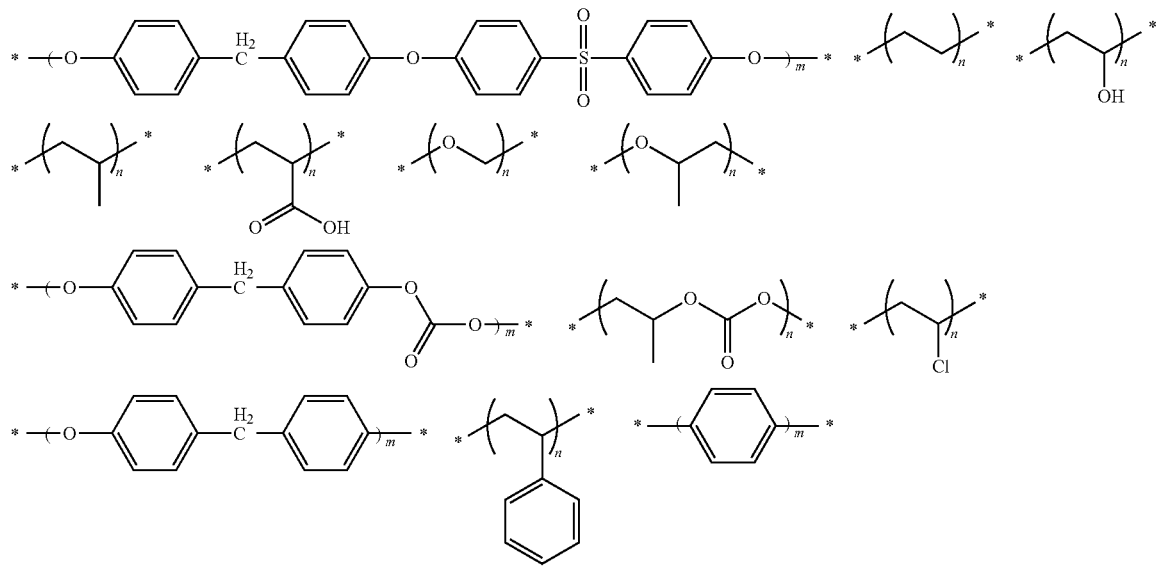

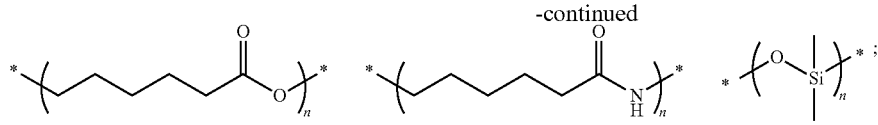

wherein n is an integer between 1 and 10,000, inclusive; wherein m is an integer between 1 and 5,000, inclusive; wherein $R_2$, $R_3$, $R_4$, $R_5$, and $R_6$ are each independently selected from the group consisting of:

and wherein * indicates a point of attachment.

Some embodiments are generally directed to various high oxidation potential electrolytes comprising a polymer comprising a product of a crosslinking reaction including a polymer selected from the group consisting of:

where $R_1$ comprises a structure selected from the group consisting of:

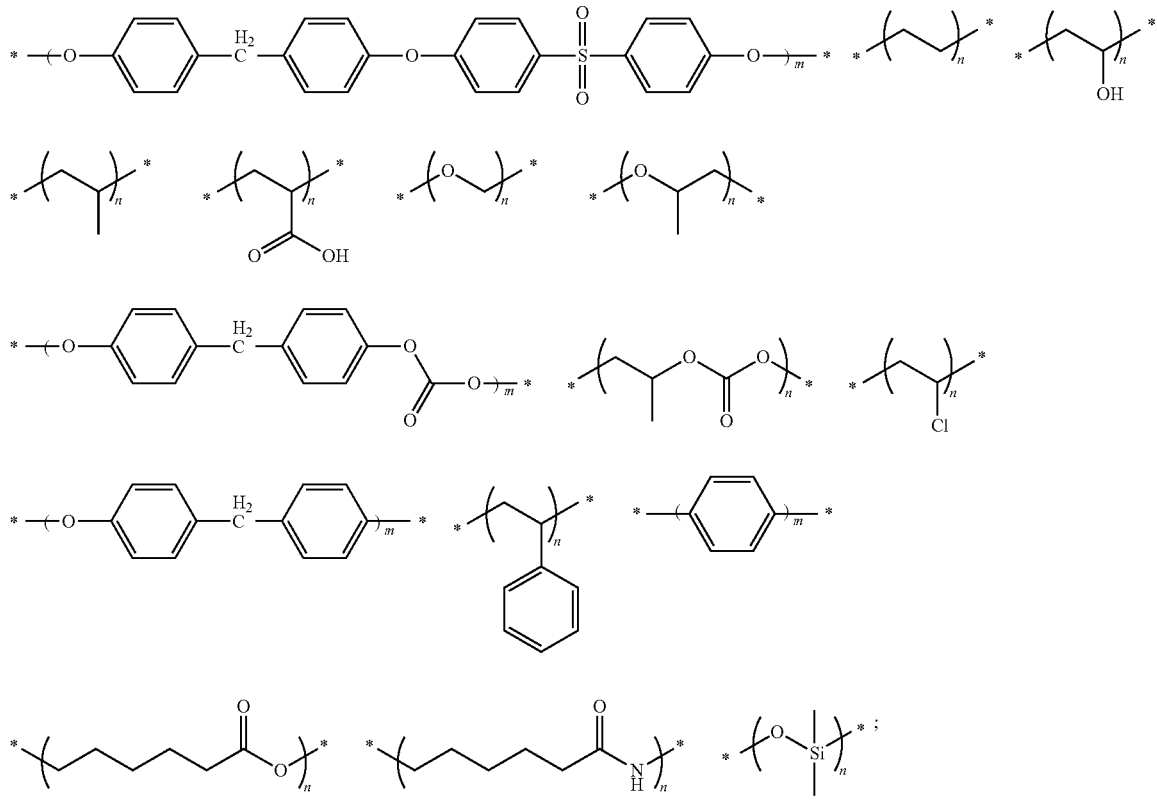

where n is an integer between 1 and 10,000, inclusive; where m is an integer between 1 and 5,000, inclusive; where $R_2$, $R_3$, $R_4$, $R_5$, and $R_6$ are each independently selected from the group consisting of:

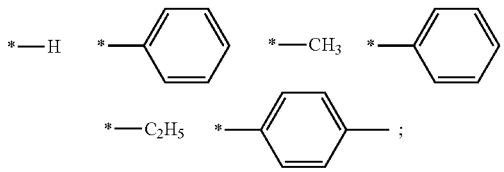

and where * indicates a point of attachment.

In one aspect, the present disclosure encompasses methods of making one or more of the embodiments described herein, for example, electrolytes based on ion dissociation compounds. In another aspect, the present disclosure encompasses methods of making a solid electrochemical device.

In some cases, the electrolyte may be a high oxidation potential electrolyte. For example, in one set of embodiments, the method includes mixing a polymer with a solvent to form a slurry, removing the solvent, and curing the slurry to form a solid electrolyte.

In yet another aspect, the present invention encompasses methods of making one or more of the embodiments described herein, for example, electrolytes for use in various electrochemical devices. In still another aspect, the present invention encompasses methods of using one or more of the embodiments described herein, for example, electrolytes for use in various electrochemical devices, for example, based on ion dissociation compounds.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
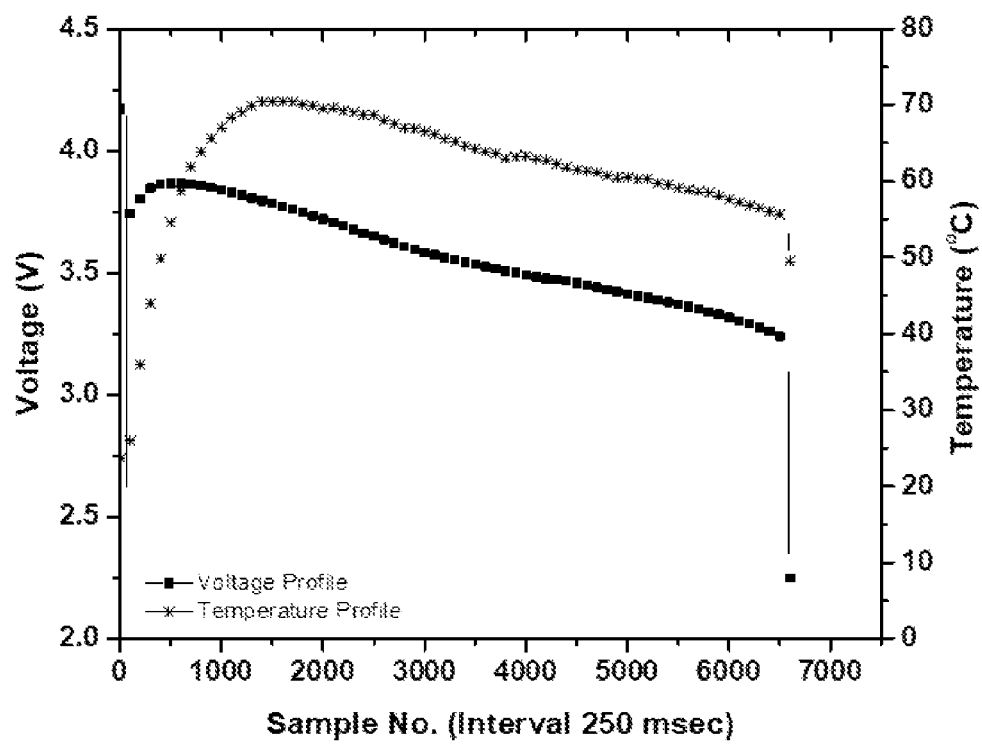
FIG. 1 illustrates safety performance curves of an electrolyte in accordance with certain embodiments of the disclosure.

The present invention generally relates to electrolytes for use in various electrochemical devices. In some cases, the electrolytes are relatively safe to use; for example, the electrolytes may be resistant to overheating, catching on fire, burning, exploding, etc. In some embodiments, such electrolytes may be useful for certain types of high-voltage cathode materials. In some cases, the electrolytes may include ion dissociation compounds that can dissociate tight ion pairs. Non-limiting examples of ion dissociation compounds include trialkyl phosphates, sulfones, or the like. Other aspects of the invention are generally directed to devices including such electrolytes, methods of making or using such electrolytes, kits including such electrolytes, or the like.

In one aspect, the present invention is generally directed to electrolyte materials comprising electrolyte salts such as lithium or sodium salts, ion dissociation compounds, and polymers. In some embodiments, these are generally related to various high oxidation potential electrolytes suitable for various electrochemical devices. In some cases, such electrolytes may exhibit better ionic conductivities. For example, ions such as lithium ions may be conducted faster and/or more efficiently within the electrolyte. This may be useful, for example, for faster charging/discharging of the electrochemical device.

Certain embodiments include an ion dissociation compound. The ion dissociation compound can be an organic compound. In some embodiments, the ion dissociation compound can dissociate ion pairs present in solution (such as lithium ions from a lithium NMC compound), and in some cases, form a chemical complex with an ion from the ion pair (e.g., such as with a lithium ion). Without wishing to be bound by any theory, it is believed that the complex forms due to coordinate chemistry; for example, the P=O and S=O groups in trialkyl phosphates or sulfones, respectively, can coordinate to the Li cation to form a chemical complex. Non-limiting examples of ion dissociation compounds include flame retardants, phosphates including organophosphates, sulfones, polar aprotic solvents, or the like. These ion dissociation compounds, and their reactions, are discussed in more detail below.

In some embodiments, the polymer may be formed from polymerization reactions comprising one or more of the following monomers:

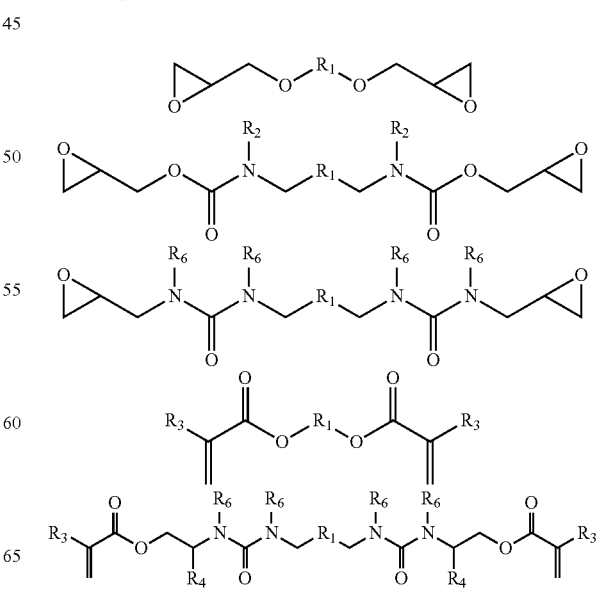

-continued

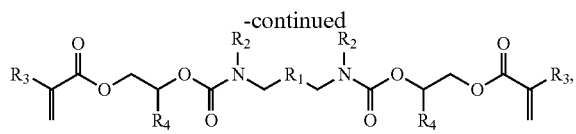

where $R_1$ can be one of the following groups:

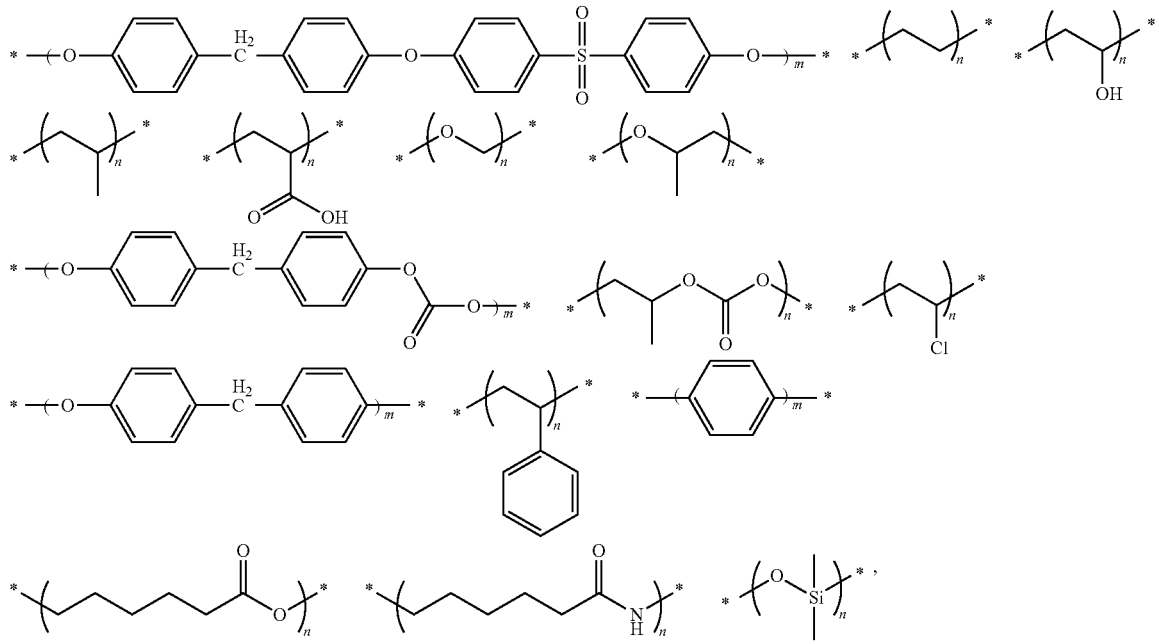

where n is an integer between 1 and 10000, m is a integer between 1 and 5000, and $R_2$ to $R_6$ can each independently be one of the following structures:

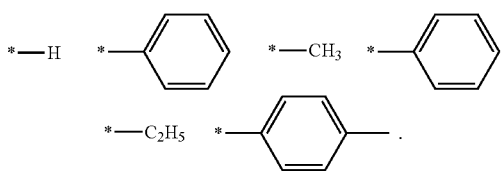

Other monomers may also be polymerized into the polymer in some cases, e.g., in addition to these. In addition, in some cases, the incorporation of urea or carbamate functional groups with UV crosslinking can be used to improve mechanical properties and/or electrochemical performance. Additional examples of polymers include, but are not limited to, those described in U.S. patent application Ser. No. 16/240,502, filed Jan. 4, 2019, entitled "Polymer Solid Electrolytes," incorporated herein by reference in its entirety.

In certain embodiments, an electrode material may surround by electrolyte, e.g., filling in porous spaces within the electrode. For example, one aspect is generally directed to an electrochemical device comprising an electrode comprising particles. Some or all of the particles may be surrounded by an electrolyte, such as a solid electrolyte. In some cases, at least some of the pores or interstices between the particles may be filled by an electrolyte. Since the particles can be surrounded by electrolyte such that at least some of the pores or interstices are filled by electrolyte, contact between the particles and the electrolyte may be very close. This may allow the internal resistance of the electrochemical device to be lower, which may allow the electrochemical device to exhibit higher capacities. Examples of such electrodes may be found, e.g., in a US patent application filed on even date herewith, entitled "Electrodes for Lithium-Ion Batteries and Other Applications," incorporated herein by reference in its entirety.

In some cases, such electrolyte materials may be used in electrochemical devices such as batteries, capacitors, sensors, condensers, electrochromic elements, photoelectric conversion elements, etc. For example, in certain embodiments, electrolyte materials such as those described herein may be used to create safer, longer-life lithium batteries.

It should be understood that other embodiments are also possible in addition to the above discussion. For instance, more generally, various aspects of the invention are directed to electrolytes for use in various electrochemical devices, including electrolytes containing ion dissociation compounds.

As mentioned, in certain embodiments, an ion dissociation compound is present in an electrolyte within an electrochemical device. Without wishing to be bound by any theory, it is believed that the ion dissociation compound is one that can dissolve Li salts and/or help release ions, such as those bound to ion pairs (for example, lithium ions from a lithium NMC compound), and allow the ions to enter solution. Thus, an ion dissociation compound is one that can increase the solubility limits of Li in a solution, relative to the absence of the ion dissociation compound in the solution. This may, for example, allow more ions to participate in charging/discharging of the electrochemical device, which can lead to improvements such as electrolytes with improved oxidation potentials, increased ionic conductivities, higher flash points, or higher working temperatures, etc., as discussed below. A variety of compounds may be used as the ion dissociation compound. In some case, the ion dissociation compound is an organic compound. Non-limiting examples of ion dissociation compounds include flame retardants, phosphates including organophosphates, sulfones, polar aprotic solvents, or the like.

For example, according to one set of embodiments, the ion dissociation compound comprises a sulfone. The sulfone may have a structure $R^2$—$SO_2$—$R^1$, where the R's may be the same or different. Each R may be, for example, a hydrocarbon chain, such as an alkyl (substituted or unsubstituted), an alkenyl (substituted or unsubstituted), an alkynyl (substituted or unsubstituted), or the like. Specific non-limiting examples of sulfones include divinyl sulfone, allyl methyl sulfone, butadiene sulfone, or ethyl vinyl sulfone. In some cases, sulfones such as these can also be used as crosslinking agents, e.g., since they contain double bonds, e.g., for radical polymerizations. Additional examples of sulfones include, but are not limited to, dimethyl sulfone, diphenyl sulfone, methyl phenyl sulfone, isopropyl sulfone, trimethylene sulfone, tetramethylene sulfone, diethyl sulfone, ethyl methyl sulfone, or the like. In one set of embodiments, the sulfone may be present at no more than 0.3 wt %, no more than 0.2 wt %, no more than 0.1 wt %, etc.

In some cases, the ion dissociation compound may comprise a polar solvent, such as a polar aprotic solvent. The polar aprotic solvent may, in some cases, have high thermal and/or voltage stability, e.g., when used as electrolyte solvent. The aprotic solvent may in some cases lack O—H and N—H bonds. Non-limiting examples of polar aprotic solvents include ethylene carbonate, or sulfones such as those discussed herein. The polarity of the solvent may be one with a relatively dipole moment of between 1 and 5.5, e.g., of at least 1.5 at least 1.75, at least 2, at least 3, at least 4, at least 5, and/or no more than 5.5, no more than 4.5, no more than 3.5, no more than 2.5, or no more than 1.5. The polar aprotic solvent may be able to solvate ions via their large dipole moments.

In another set of embodiments, the ion dissociation compound comprises a flame retardant. A variety of flame retardants are commercially available. Non-limiting examples of suitable flame retardants include nitrogen-containing flame retardants, silicon-containing flame retardants, fluorine-containing flame retardants (e.g., methyl difluoroacetate, and difluoroethyl acetate), composite flame-retardant additives, organophosphorus flame retardants (for example, trialkyl phosphate, for example, triethyl phosphate or trimethyl phosphate), or the like. In one set of embodiments, the flame retardant may be present at no more than 0.3 wt %, no more than 0.2 wt %, no more than 0.1 wt %, etc. Those of ordinary skill in the art will be able to identify suitable flame retardants, for example, as is discussed in Beard and Angeler, "Flame Retardants: Chemistry, Applications, and Environmental Impacts," in *Handbook of Combustion,* 2010 or Hyung, et al., "Flame-retardant additives for lithium-ion batteries," *J. Power Sources,* 119-121:383-387, 2003.

In some cases, a flame retardant can be used to improve safety. For example, a flame retardant can be chosen that has a high boiling point (e.g., between 100 and 300° C.), a high flash point (e.g., between 50° C. and 250° C.), a low melting point (e.g., between −50° C. and 70° C.), a high dielectric constant (e.g., between 1 and 80 at 25° C.), good stability, and/or low cost, etc. A flame retardant can also be used in some cases to prevent or inhibit fire and/or explosion, e.g., caused by the excessive rise of temperature in the battery.

In one set of embodiments, an ion dissociation compound, such as a sulfone, may be used in combination with various lithium salts or ions, or other salts or ions, e.g., as is discussed herein. Examples of such lithium salts include, but are not limited to, lithium hexafluorophosphate (LiPF$_6$), lithium bis(fluorosulfonyl)imide (LiFSI) and lithium bis (trifluoromethanesulfonyl)imide (LiTFSI), a highly conductive lithium salt with an anion that has strong tendency to donate fluorine. In some cases, the combination of a lithium salt and the ion dissociation compound may exhibit synergistic interphase formation mechanisms, such as CEI or SEI. Together, these interphase formations may allow stable coupling of the electrodes. For example, a stable configuration of a graphitic anode and a high-voltage cathode over an extended temperature range may be achieved in accordance with certain embodiments.

In addition, the improved oxidation potential of an electrolyte, e.g., in association with an ion dissociation compound such as is discussed herein, may provide enhanced stability in certain embodiments in liquid and/or solid electrolytes. The ion dissociation compound may include sulfone or other compounds such as is described herein. Such electrolytes may be used, for example, for safe, longer-life and/or higher voltage lithium batteries.

In some embodiments, an electrolyte salt may be present. These may include alkali metal salts, such as lithium, sodium, or magnesium salts. Specific non-limiting examples of lithium salts include LiTFSI, LiFSI, LiBOB, LiPF$_6$, LiBF$_4$, LiClO$_4$, LiAsF$_6$, LiN(CF$_3$SO$_2$)$_2$, LiC(CF$_3$SO$_2$)$_3$, LiDFOB, LiF, LiCl, LiBr, LiI, Li$_2$SO$_4$, LiNO$_3$, Li$_3$PO$_4$, Li$_2$CO$_3$, LiOH, lithium acetate, lithium trifluoromethyl acetate, lithium oxalate, etc. Other examples include, but are not limited to, quaternary ammonium salts, quaternary phosphonium salt, transition metal salts, or salts of protonic acids. Non-limiting examples of protonic acids include dimethyldioctadecylammonium chloride, tetraphenylphosphonium chloride, cobalt sulfate, lithium sulfate, etc.

In some cases, the electrolyte salt such as those described herein can be present at a concentration of at least 1 M, at least 2 M, at least 3 M, at least 4 M, at least 5 M, at least 6 M, at least 7 M, at least 8 M, at least 9 M, at least 10 M, and/or no more than 10 M, no more than 9 M, no more than 8 M, no more than 7 M, no more than 6 M, no more than 5 M, no more than 4 M, no more than 3 M, no more than 2 M, no more than 1 M, etc. Combinations of any of these are also possible in some embodiments, e.g., the electrolyte salt may be present at between 1 M and 3 M.

In one set of embodiments, the electrolyte salt may be present at a mole fraction of at least 0.01, at least 0.03, at least 0.05, at least 0.1, at least 0.13, at least 0.15, at least 0.2, at least 0.23, at least 0.25, at least 0.3, at least 0.33, at least 0.35, at least 0.4, at least 0.43, at least 0.45, at least 0.5, at least 0.53, at least 0.55, at least 0.6, at least 0.63, at least 0.65, at least 0.7, and/or no more than 0.7, no more than 0.65, no more than 0.63, no more than 0.617, no more than 0.6, no more than 0.55, no more than 0.53, no more than 0.5, no more than 0.45, no more than 0.43, no more than 0.4, no more than 0.35, no more than 0.33, no more than 0.3, no more than 0.25, no more than 0.23, no more than 0.2, no more than 0.15, no more than 0.13, no more than 0.1, etc.

Controlling the electrolyte salt concentration may be an effective strategy to obtain certain functionalities of liquid electrolytes, including wide electrochemical stability windows. For example, electrolytes based on concentrated LiTFSI in organic phosphates may exhibit unusual capabilities in enabling reversible cycling of Li$^+$ ions in carbonaceous electrodes. For example, the enhanced solvation in high-concentration electrolytes (HCEs) (e.g., greater than 0.5 M, greater than 1.2 M, or greater than 3 M in some cases) can effectively stabilize the ion dissociation compound molecules and facilitate the formation of a salt-derived SEI that may mitigate anode and electrolyte degradation during extended cycling. Without wishing to be bound by any theory, it is believed that high-concentration electrolytes may indicate more ion dissociation compound molecules coordinated with Li ions; since the ion dissociation compound molecules can be reduced at a Li metal surface, the reduction of those free molecules may be beneficial for stabilizing the Li metal surface.

In addition, in some cases, a polymer may also be present. In some cases, a polymer such as those described herein can be present at a concentration of at least 1 wt %, at least 2 wt %, at least 3 wt %, at least 4 wt %, at least 5 wt %, at least 6 wt %, at least 7 wt %, at least 8 wt % at least 9 wt %, at least 10 wt %, at least 11 wt %, at least 12 wt %, at least 13 wt %, at least 14 wt %, at least 15 wt %, at least 16 wt %, at least 17 wt % at least 18 wt % at least 19 wt % at least 20 wt %, 21 wt %, at least 22 wt %, at least 23 wt %, at least 24 wt %, at least 25 wt %, at least 26 wt %, at least 27 wt %, at least 28 wt % at least 29 wt %, at least 30 wt %, at least 31 wt %, at least 32 wt %, at least 33 wt %, at least 34 wt %, at least 35 wt %, at least 36 wt %, at least 37 wt % at least 38 wt % at least 39 wt % at least 40 wt %, and/or no more than 40 wt %, no more than 39 wt %, no more than 38 wt %, no more than 37 wt %, no more than 36 wt %, no more than 35 wt %, no more than 34 wt %, no more than 33 wt %, no more than 32 wt %, no more than 31 wt %, no more than 30 wt %, no more than 29 wt %, no more than 28 wt %, no more than 27 wt %, no more than 26 wt %, no more than 25 wt %, no more than 24 wt %, no more than 23 wt %, no more than 22 wt %, no more than 21 wt %, no more than 20 wt %, no more than 19 wt %, no more than 18 wt %, no more than 17 wt %, no more than 16 wt %, no more than 15 wt %, no more than 14 wt %, no more than 13 wt %, no more than 12 wt %, no more than 11 wt %, no more than 10 wt %, no more than 9 wt %, no more than 8 wt %, no more than 7 wt %, no more than 6 wt %, no more than 5 wt %, no more than 4 wt %, no more than 3 wt %, no more than 2 wt %, no more than 1 wt %, etc.

Various polymers can be used. The polymer may include one or more co-polymers. It may be desirable that the polymer be conducting, although some polymers may be non-conducting. More than one polymer may be present in some cases.

The molecular weight of the polymer is not particularly limited, and may be any of a broad range of molecular weights. For example, the molecular weight may be at least 100, at least 200, at least 300, at least 500, at least 1,000, at least 3,000, at least 10,000, at least 30,000, at least 100,000, at least 300,000, at least 1,000,000, etc. In some cases, the molecular weight may be no more than 10,000,000, no more than 3,000,000, no more than 1,000,000, no more than 300,000, no more than 100,000, no more than 30,000, no more than 10,000, no more than 3,000, no more than 1,000, no more than 500, no more than 300, etc. Combinations of any of these are also possible e.g., the molecular weight may be between 200 and 1,000. The molecular weight may be determined as a number average molecular weight.

Non-limiting examples of polymers include poly(ethylene) (PE), poly(ethylene oxide) (PEO), poly(propylene) (PP), poly(propylene oxide), polymethyl methacrylate (PMMA), polyacrylonitrile (PAN), poly(bis(methoxy ethoxyethoxide)-phosphazene), poly(dimethylsiloxane) (PDMS), cellulose, cellulose acetate, cellulose acetate butylate, cellulose acetate propionate, polyvinylidene difluoride (PVdF), polyvinylpyrrolidone (PVP), polystyrene, sulfonate (PSS), poly(vinylidene chloride), polypropylene oxide, polyvinylacetate, polytetrafluoroethylene (e.g., Teflon), poly (ethyleneterephthalate) (PET), polyimide, polyhydroxyalkanoate (PHA), PEO containing co-polymers (e.g., polystyrene (PS)-PEO copolymers and poly(methyl methacrylate) (PMMA)-PEO copolymers), poly(acrylonitrile-co-methylacrylate), PVdF containing co-polymers (e.g., polyvinylidenefluoride-co-hexafluoropropylene(PVdF-co-HFP), PMMA co-polymers (e.g. poly(methylmethacrylate-co-ethylacylate)), or the like. Derivatives of any of these may also be included. In various examples, the polymeric material is a combination of two or more of these polymers.

The polymer can have various structures (e.g., secondary structures). In various examples, the polymer may be amorphous, crystalline, or a combination thereof. It may be desirable in some embodiments that the polymer(s) and/or copolymers have low crystallinity. For example, the crystallinity may be less than 70%, less than 60%, less than 50%, less than 40%, or less than 30%. The crystallinity can be measured, for example, using DSC by comparing the exothermic energy of the crystallization process for a semicrystaline polymer with the energy of prefect crystal which is calculated based on the crystallization.

In some cases, a polymer may exhibit improved properties due to the addition of functional groups such as urea and/or carbamate moieties within the polymer, e.g., within the backbone structure of the polymer. In some cases, the urea and/or carbamate moieties may be crosslinked together, and/or to other polymers, e.g., as described herein. Without wishing to be bound by any theory, it is believed that groups such as urea, urethane, or carbamate contain both hydrogen bond donors and acceptors, which may lead to improvements in properties such as mechanical and/or electrochemical properties, e.g., as discussed herein. For instance, urea linkers with rigid bonding may help to improve mechanical strength. In addition, the hydrogen bonds may help to dissociate lithium salts, which may lead to improved ionic conductivity.

In some embodiments, groups such as urea, urethane, or carbamate may be present in the backbone of the polymer, for example, as a linker between a middle polymeric fragment and two acrylic ends. The urea and/or carbamate may be provided within the polymer using different combinations of functional groups, such as amine and carbamate, or alcohol and isocyanate, during formation of the polymer. Such groups may be present next to each other, and/or some of the groups may be separated by spacer groups, e.g., between the urea and/or carbamate, and an acrylate.

Non-limiting examples of polymers include those created by polymerizing one or more of the following polymer precursors, and/or other precursors:

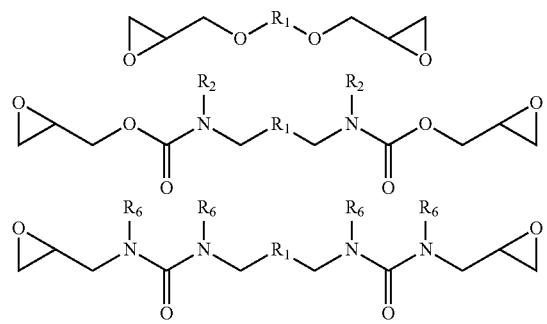

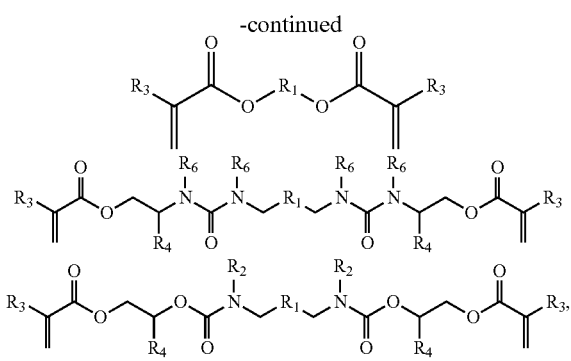

In these structures, $R_1$ may be selected to allow complexation with salts or ions, e.g., to produce a polymer/salt complex that can act as an electrolyte. For example, $R_1$ may include charged moieties, and/or moieties that are uncharged but are readily ionizable to produce a charge, e.g., at acidic or alkaline pH's (for instance, at pH's of less than 5, less than 4, less than 3, or less than 2, or greater than 9, greater than 10, greater than 11, or greater than 12). Specific examples of $R_1$ include, but are not limited to, the following (where * indicates a point of attachment):

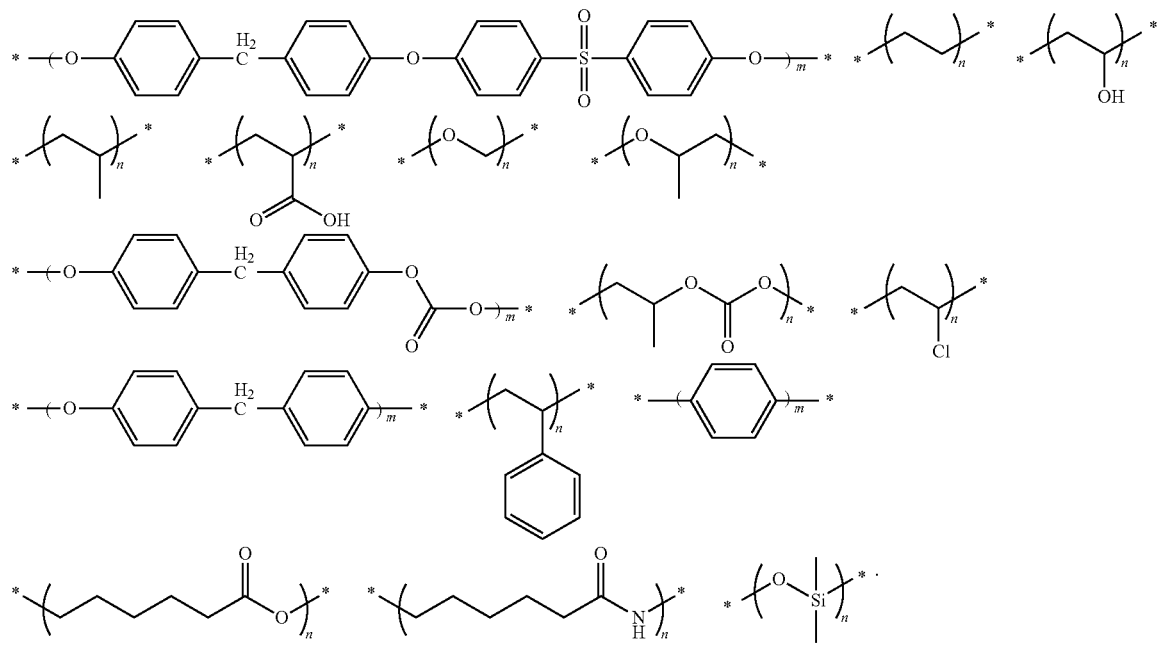

In addition, in some cases, 2, 3, 4, or more of the following may be present simultaneously within the $R_1$ structure, e.g., as copolymers. For example, they may be present in alternating, block, random or other copolymer structures to define the Ri moiety. In some cases, 2, 3, 4, or more polymers may be present, and in some cases may be crosslinked together, e.g., as discussed herein.

In these structures n and/or m (as applicable) may each be an integer. In some cases, n and/or m may each be less than 100,000, less than 50,000, less than 30,000, less than 10,000, less than 5,000, less than 3,000, less than 1,000, less than 500, etc. In certain cases, n and/or m may be at least 1, at least 3, at least 5, at least 10, at least 30, at least 50, at least 100, at least 300, at least 500, at least 1,000, at least 3,000, at least 5,000, at least 10,000, at least 30,000, at least 50,000 etc. Combinations of any of these ranges are possible; as non-limiting examples, n may be an integer between 1 and 10000, m may be an integer between 1 and 5000, n may be an integer between 1000 and 5000, m may be an integer between 500 and 1000, etc.

In these structures $R_2$, $R_3$, $R_4$, $R_5$, and $R_6$ may each be independently chosen (as applicable) to make the polymers symmetric or non-symmetric. Examples of $R_2$, $R_3$, $R_4$, $R_5$, and $R_6$ include, but are not limited to, one of the following structures:

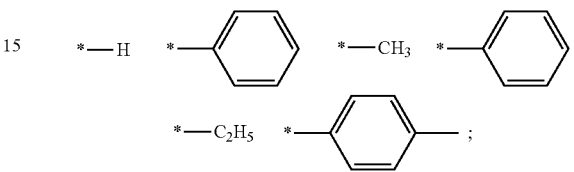

Other examples of $R_2$, $R_3$, $R_4$, $R_5$, and $R_6$ include, but are not limited to, an acrylate, an ethylene oxide, an epoxy ethyl group, an isocyanates, a cyclic carbonate, a lactone, a lactams, a vinyl group ($CH_2$=CH—), or a vinyl derivative (i.e., where 1, 2, or 3 of the H's in the $CH_2$=CH— structure have been replaced by an F or a Cl). Non-limiting examples of cyclic carbonates include ethylene carbonate, propylene carbonate, fluoroethylene carbonate, etc. In addition, it should be understood that these endgroups are provided by way of example only. In general, the endgroups are not critical, as they typically would not affect performance in a significant way.

In addition, in one set of embodiments, functional groups such as urea and/or carbamate may be crosslinked together, e.g., as described herein. For example, such functional groups may be crosslinked together using UV light, thermoforming or exposure to elevated temperatures (e.g., between temperatures of 20° C. and 100° C.), or other methods including those described herein. In some cases, the incorporation of urea or carbamate functional groups can improve mechanical properties, electrochemical performances, or the like, such as relatively high ionic conductivities, ion transference numbers, decomposition voltages, tensile strength, or the like.

In one set of embodiments, the polymer may be present at a mole fraction of at least 0.01, at least 0.02, at least 0.027, at least 0.03, at least 0.05, at least 0.1, at least 0.11, at least 0.12, at least 0.13, at least 0.15, at least 0.2, at least 0.21, at least 0.22, at least 0.23, at least 0.25, at least 0.3, and/or no more than 0.3, no more than 0.25, no more than 0.32, no more than 0.22, no more than 0.21, no more than 0.2, no more than 0.15, no more than 0.13, no more than 0.12, no more than 0.11, no more than 0.1, no more than 0.05, no more than 0.03, no more than 0.02, no more than 0.01, etc.

In addition, as discussed, more than one polymer may be present, e.g., as a physical blend and/or as a copolymer, etc., including any combination of these polymers, and/or other polymers.

Still other examples of polymers include, those described in U.S. patent application Ser. No. 16/240,502, filed Jan. 4, 2019, entitled "Polymer Solid Electrolytes," incorporated herein by reference in its entirety.

In one set of embodiments, the polymer includes a plasticizer, which may be useful for improve processability of the polymer, and/or controlling the ionic conductivity and mechanical strength. For example the plasticizer may be a polymer, a small molecule (i.e., having a molecular weight of less than 1 kDa), a nitrile, an oligoether (e.g., triglyme), cyclic carbonate, ionic liquids, or the like. Non-limiting examples of potentially suitable plasticizers include ethylene carbonate, succinonitrile, sulfolane, phosphate, or the like. Non-limiting examples of nitriles include succinonitrile, glutaronitrile, hexonitrile, and/or malononitrile. Non-limiting examples of cyclic carbonate include ethylene carbonate, propylene carbonate, fluoroethylene carbonate, etc. Non-limiting examples of ionic liquids include N-propyl-N-methylpyrrolidinium bis(fluorosulfonyl)imide or 1-ethyl-3-methylimidazolium bis(fluorosulfonyl)imide. Other non-limiting examples of plasticizers include polymers such as polyethylene oxide, a polycarbonate, a polyacrylonitrile, a polylactic acid, or the like. In some cases, the plasticizer may be a polymer that is relatively hydrophilic, e.g., having a water contact angle of less than 90°. In addition, the polymer may be free of sulfur. Other examples of plasticizers include those described in U.S. patent application Ser. No. 16/240,502, filed Jan. 4, 2019, entitled "Polymer Solid Electrolytes," incorporated herein by reference in its entirety.

In some embodiments, the plasticizer can be present at a mole fraction of at least 0.1, at least 0.11, at least 0.12, at least 0.13, at least 0.15, at least 0.2, at least 0.22, at least 0.23, at least 0.25, at least 0.287, at least 0.3, at least 0.31, at least 0.32, at least 0.33, at least 0.35, at least 0.4, at least 0.5, at least 0.6, at least 0.7, at least 0.8, at least 0.9, at least 0.93, at least 0.95, and/or no more than 0.95, no more than, no more than 0.93, no more than 0.916, no more than 0.9, no more than 0.8, no more than 0.7, no more than 0.6, no more than 0.5, no more than 0.4, no more than 0.35, no more than 0.33, no more than 0.32, no more than 0.31, no more than 0.3, no more than 0.25, no more than 0.32, no more than 0.22, no more than 0.21, no more than 0.2, no more than 0.15, no more than 0.13, no more than 0.12, no more than 0.11, no more than 0.1, etc.

In one set of embodiments, the solid electrolyte may have a molar ratio of (polymer+crosslinkable oligomer) to plasticizer that is at least 1:0.2, at least 1:0.5, at least 1:1, at least 1:1.5, at least 1:2, at least 1:3, at least 1:5, and/or a ratio that is no more than 1:5, no more than 1:3, no more than 1:2, no more than 1:1.5, no more than 1:1, no more than 1:0.5, or no more than 1:0.2, Combinations of any of these are also possible, e.g., the ratio of (polymer+crosslinkable oligomer) to plasticizer may be between 2:1 and 1:2.

In addition, additives or other compounds may also be present, such as cathode protective agents, anode protective agents, anti-oxidative agents, inorganic additives, etc., in certain embodiments. Non-limiting examples of inorganic additives include $Al_2O_3$, $SiO_2$, $SiO_x$, $TiO_2$, $Li_3PS_4$, $Li_{10}GeP_2S_{12}$, $Li_7La_3Zr_2O_{12}$, $Li_{6.4}La_3Zr_{1.4}Ta_{0.6}O_{12}$, $LiLaTiO_3$, $Li_{1.3}Al_{0.3}Ti_{1.7}(PO_4)_3$, $Li_{1.3}Al_{0.3}Ge_{1.7}(PO_4)_3$, etc. An example of a cathode protective agent is LiDFOB (lithium difluoro(oxalato)borate). An example of an anode protective agent is fluoroethylene carbonate. An example of an anti-oxidative agent is LiBOB (lithium bis(oxalate)borate). Other similar compounds will be known by those of ordinary skill in the art. These may be added for a variety of reasons, e.g., to improve other performance metrics, such as cyclability. In some cases, an inorganic additive may be used that contains generally electronegative atoms such as oxygen, which may attract cations. Thus, for example, ions such as $Li^+$ can be relocated relatively more easily than the anions.

In another set of embodiments, the solid electrolyte may contain an organic carbonate additive. Without wishing to be bound by any theory, in addition to a less-resistive solid electrolyte interphase (SEI), an organic carbonate can significantly enhance the wettability of electrodes in the corresponding electrolytes, which may improve battery performance to achieve higher capacities, in comparison with electrolytes without any organic carbonates additives. For example, organic carbonates may exhibit stability at negative potentials. In some cases, organic carbonates can extend the electrochemical stability of the electrolyte towards negative potentials. A small amount of organic carbonate can significantly improve the battery performance of the polymer solid electrolyte, e.g., because the presence of organic additives may increase ionic mobility by lowering lithium coordination, while the electrolyte is still non-flammable.

Non-limiting examples of organic carbonates additives include ethylene carbonate (EC), vinylene carbonate (VC), fluoroethylene carbonate (FEC), methylene-ethylene carbonate (MEC), 1,2-dimethoxyethane carbonates (DME), diethylene carbonate (DEC), (4R,5S)-4,5-difluoro-1,3-dioxolan-2-one (DiFEC). More than one organic carbonate additive, including these and/or other additives, are also possible. The organic carbonate may be present at no more than 15 wt %, no more than 10 wt %, no more than 5 wt %, etc. of the solid electrolyte.

In one set of embodiments, the electrolyte further comprises a stabilization additive. Non-limiting examples of stabilization additives include lithium bis(oxalato)borate (LiBoB) or $LiBF_4$, etc. In one set of embodiments, the stabilization additive may be present at no more than 0.3 wt %, no more than 0.2 wt %, no more than 0.1 wt %, etc. Without wishing to be bound by any theory, stabilization additives may be useful in certain embodiments for sustaining the voltage of the polymer electrolyte; as a non-limiting example, an electrolyte may not be able to sustain a voltage above 3.9 V, but could sustain a voltage of at least 4.4 V with a stabilization additive.

In some embodiments, the electrolyte may further comprise an initiator, such as a stabilization initiator. Non-limiting examples include benzoyl peroxide, 2,2'-azobisisobutyronitrile (AIBN), 4,4-azobis (4-cyanovaleric acid)

(ACVA), potassium persulfate, or the like. Other examples include Irgacure initiator, 2,2'-azobis(2-methylpropionitrile), ammonium persulfate, or other initiators known to those of ordinary skill in the art. In some embodiments, the initiator may be used to initiate the crosslink reactions within the polymer, or to otherwise facilitate polymerization. Those of ordinary skill in the art will know of other initiators that can be used, in addition and/or in combination with these. Many initiators are readily obtainable commercially. In one set of embodiments, the initiator may be present at no more than 0.3 wt %, no more than 0.2 wt %, no more than 0.1 wt %, etc. In some cases, the initiator may be added to have a mole fraction between 0.001 and 0.01, or other suitable mole fractions to facilitate polymerization.

In some embodiments, the electrolyte may further comprise a phosphine-based additive. Non-limiting examples of phosphine-based additives include hexafluoroisopropyl triphosphate, triisopropyl ethylsulfonyl (pentafluorophenyl) phosphine, or the like. In one set of embodiments, the phosphine-based additive may be present at no more than 0.3 wt %, no more than 0.2 wt %, no more than 0.1 wt %, etc.

In some embodiments, the electrolyte may further comprise an ether additive. An ether additive may be a linear polymer which helps with ion transport in some cases. For example, the ether additive may increase the conductivity of the solid electrolyte. Non-limiting examples of ether additives include hydrofluoroether,1,1,2,2-tetrafluoroethyl 2,2,3, 3-tetrafluoropropyl ether, bis(2,2,2-trifluoroethyl) ether, oligo ethylene glycol methyl ether, tetraethylene glycol dimethyl ether, bis(2,2,2-trifluoroethyl) ether, oligo ethylene glycol methyl ether, etc. In one set of embodiments, the ether additive may be present at no more than 0.3 wt %, no more than 0.2 wt %, no more than 0.1 wt %, etc.

Non-limiting examples of other suitable additives include oligoethylene glycol, carbonates such as 1,2-dimethoxyethane carbonates, fluoroethylene carbonate, vinylene carbonate, etc., (4R,5S)-4,5-difluoro-1,3-dixolan-2-one, methylene-ethylene carbonate, prop-1-ene-1,3-sultone, succinic anhydride.

Some additives, such as ethylene carbonate (EC), vinylene carbonate (VC), fluoroethylene carbonate(FEC), (4R,5S)-4,5-difluoro-1,3-dixolan-2-one (DiFEC), methylene-ethylene carbonate (MEC), prop-1-ene-1,3-sultone (PES), and/or succinic anhydride (SA), may be able to preferentially break down and undergo polymerization and ion-exchange reactions at the anode/electrolyte interface to produce a solid-electrolyte-interphase (SEI) with desirable chemical composition and physical properties. Without wishing to be bound by any theory, a stable SEI may, in some cases, be able to accommodate cyclic volume changes at the anode during charge (addition) and discharge (removal) of metal atoms to the electrode.

In some cases, additives such as those described herein can be present at a weight percentage of at least 1 wt %, at least 2 wt %, at least 3 wt %, at least 4 wt %, at least 5 wt %, at least 6 wt %, at least 7 wt %, at least 8 wt % at least 9 wt %, at least 10 wt %, at least 11 wt %, at least 12 wt %, at least 13 wt %, at least 14 wt %, at least 15 wt %, at least 16 wt %, at least 17 wt % at least 18 wt % at least 19 wt % at least 20 wt %, and/or no more than 20 wt %, no more than 19 wt %, no more than 18 wt %, no more than 17 wt %, no more than 16 wt %, no more than 15 wt %, no more than 14 wt %, no more than 13 wt %, no more than 12 wt %, no more than 11 wt %, no more than 10 wt %, no more than 9 wt %, no more than 8 wt %, no more than 7 wt %, no more than 6 wt %, no more than 5 wt %, no more than 4 wt %, no more than 3 wt %, no more than 2 wt %, no more than 1 wt %, etc.

In some cases, electrolytes such as those described herein may provide certain beneficial properties, such as surprisingly high ionic conductivities, compared to other solid electrolytes. For example, the polymer solid electrolyte may exhibit ionic conductivities of at least $10^{-8}$ S/cm, at least $2\times10^{-8}$ S/cm, at least $3\times10^{-8}$ S/cm, at least $5\times10^{-8}$ S/cm, at least $10^{-7}$ S/cm, at least $2\times10^{-7}$ S/cm, at least $3\times10^{-7}$ S/cm, at least $5\times10^{-7}$ S/cm, at least $10^{-6}$ S/cm, at least $2\times10^{-6}$ S/cm, at least $3\times10^{-6}$ S/cm, at least $5\times10^{-6}$ S/cm, at least $10^{-5}$ S/cm, at least $2\times10^{-5}$ S/cm, at least $3\times10^{-5}$ S/cm, at least $5\times10^{-5}$ S/cm, at least $10^{-4}$ S/cm, at least $0.8\times10^{-4}$, at least $1.1\times10^{-4}$, at least $1.2\times10^{-4}$, at least $1.4\times10^{-4}$, at least $1.6\times10^{-4}$, at least $2\times10^{-4}$ S/cm, at least $3\times10^{-4}$ S/cm, at least $5\times10^{-4}$ S/cm, at least $10^{-3}$ S/cm, at least $2\times10^{-3}$ S/cm, at least $3\times10^{-3}$ S/cm, at least $5\times10^{-3}$ S/cm, etc. In one embodiment, for example, the polymer solid electrolyte has ionic conductivity in between $2.1\times10^{-6}$ S/cm and $5.2\times10^{-6}$ S/cm. In another embodiment, the ionic conductivity may be between $10^{-8}$ and $10^{-2}$ S/cm. Without wishing to be bound by any theory, it is believed that liquid-level ionic conductivity can be achieved if the physical integrity of polymer solid electrolytes were ensured by using a small amount of polymers. Ionic conductivities can be determined, for example, with a 2032 coin cell, using stainless steel as working electrode and Li metal as reference electrode, where the ionic conductivity is calculated from bulk resistance in impedance spectrum in a potentiostatic mode with a scanning frequency is from 1 MHz to 1 Hz.

As another example, the electrode may exhibit a mass loading of at least 1 mA h/cm$^2$, 1.5 mA h/cm$^2$, 2 mA h/cm$^2$, 2.5 mA h/cm$^2$, 3 mA h/cm$^2$, 3.5 mA h/cm$^2$, 4 mA h/cm$^2$, 4.5 mA h/cm$^2$, 5 mA h/cm$^2$, 5.5 mA h/cm$^2$, 6 mA h/cm$^2$, etc. The mass loading is a measure of the design area capacity of the electrode. The area is the area of the electrode. This may be determined, for example, by weighing the electrode, calculating the active material content of the electrode (e.g., the number of ions it can contain), then calculating the design capacity according to the active material content.

In addition, in some embodiments, the electrolytes such as those described herein may provide relatively high oxidation potentials. Electrolytes with relatively high oxidation potentials may be particularly useful, for example, in applications where higher voltages are required. In certain cases, the oxidation potential of the polymer solid electrolyte may be at least 0.3 V, at least 0.4 V, at least 0.5 V, at least 0.6 V, at least 0.7 V, at least 0.8 V, at least 0.9 V, at least 1 V, at least 1.5 V, at least 2 V, at least 2.5 V, at least 3 V, at least 3.5 V, at least 3.8 V, at least 4 V, at least 4.5 V, at least 5.0 V, at least 5.1 V, or at least 5.5 V. Oxidation potentials can be tested using standard techniques known to those of ordinary skill in the art, such as cyclic voltammetry. Without wishing to be bound by any theory, it is believed that electrolytes with high oxidation potentials may be relatively stable at high voltages.

In addition, in some embodiments, electrolytes such as those described herein may provide relatively high flash points. The flash point is the temperature at which a material (e.g., the electrolyte) will ignite if given an ignition source (e.g., a flame or a spark). Electrolytes with relatively high flash point may be particularly useful, for example, in applications where higher flash point are required. In certain cases, the flash point of the electrolyte may be at least 85° C., least 90° C., at least 93.3° C., at least 95° C., at least 100° C., at least 105° C., at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., at least 185° C., at least 190° C., at least 195° C., at least 200° C., etc. Flash points can be tested using standard techniques known to those of ordinary skill in the art. Without wishing to be bound by any theory, it is believed that electrolytes with relatively high flash point can be used at high temperatures, which may help the improve the safety of the electrolytes.

In addition, in some embodiments, electrolytes such as those described herein may be used or worked at relatively high temperatures, e.g., working temperatures of at least 85° C., least 90° C., at least 93° C., at least 95° C., at least 100° C., at least 105° C., at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., at least 185° C., at least 190° C., at least 195° C., at least 200° C., etc. In some cases, the electrolyte may be highly stable at relatively high temperatures. The working temperature of the electrolyte may be controlled by other parameters, such as its electrochemical stability at elevated temperature. The working temperature may be lower than the flash point.

To determine working temperature, the battery can be tested at room temperature (25° C.), where m is the cycle number when the capacity is 80% of the capacity after the first cycle. Then the battery can be tested at a working temperature T; for example, the battery can be tested in an oven with a temperature T, where n is the cycle number when the capacity is 80% of the capacity after the first cycle. The working temperature is the maximum temperature that still allows the battery to satisfy the equation $0.3 \leq n/m \leq 1$. For example, n/m can be 0.3, 0.4, 0.5, 0.6, 0.7, 0.8, 0.9, 1, etc.

In some aspects, the present invention is generally directed to an electrochemical cell, e.g., within an electrochemical device, comprising an electrolyte material such as those discussed herein. Non-limiting examples of electrochemical devices include batteries, capacitors, sensors, condensers, electrochromic elements, photoelectric conversion elements, or the like. In one set of embodiments, the electrochemical device is a battery, e.g., an ion-conducting battery. Non-limiting examples of ion-conducing batteries include lithium-ion conducting batteries, sodium-ion conducting batteries, magnesium-ion conducing batteries, and the like. For instance, the lithium-ion battery may comprise one or more lithium ion electrochemical cells, where some or all of the electrochemical cells has a structure such as is described herein. In some cases, the battery is a solid-state battery. The electrochemical device may also comprise an anode, a cathode, a separator, etc. Many of these are available commercially. An electrolyte as described herein may be used as the electrolyte of the electrochemical device, alone and/or in combination with other electrolyte materials.

The anode material may be a conducting material. For example, the anode may comprise a conducting carbon material, such as graphite, hard carbon, porous hollow carbon spheres and tubes, and the like. Other non-limiting examples of conducting materials include conducting carbon materials, tin and its alloys, tin/carbon, tin/cobalt alloys, silicon/carbon materials, and the like. Non-limiting examples of conducing carbon materials include graphite, hard carbon porous hollow carbon spheres and tubes (e.g., carbon nanotubes), and the like. As other examples, the anode may comprise silicon, tin, carbon, phosphorous, or the like. A wide variety of anodes and anode materials may be obtained commercially.

The anode may be a metal in some embodiments. Non-limiting examples of metals include lithium metal, sodium metal, magnesium metal, and the like. Lithium (Li) metal is a promising anode material, e.g., for high-energy-density storage systems, because of its high specific capacity (3860 mA h g$^{-1}$) and low reduction potential (−3.04 V) versus the standard hydrogen electrode.

In one embodiment, the anode may comprise a lithium ion-conducting material, such as lithium metal, lithium carbide, $Li_6C$, a lithium titanate (e.g., $Li_4Ti_5O_{12}$), or the like. In another embodiment, the anode material may comprise a sodium-ion-conducting material, such as sodium metal, $Na_2C_8H_4O_4$, $Na_{0.66}Li_{0.22}Ti_{0.78}O_2$, or the like. In yet another embodiment, the anode material may comprise a magnesium ion-conducting material, such as magnesium metal.

A cathode may comprise one or more the electroactive material in certain embodiments. Various electroactive materials can be used, including lithium ion-conducting material.

In some cases, the cathode may comprise one or more particles. The particles may comprise, in certain cases, one or more positive electroactive materials. The particles may comprise positive ions such as lithium, sodium, magnesium, or the like. Examples of particles for use in cathodes may be seen in a U.S. patent application filed on even date herewith, entitled "Electrodes for Lithium-Ion Batteries and Other Applications," included herein by reference in its entirety.

In one set of embodiments, the cathode may comprise lithium, which may be present, for instance, as lithium metal and/or lithium salts. Non-limiting examples include lithium cobalt oxide (LCO), lithium nickel manganese cobalt oxide (NMC) (e.g., $LiNi_{1/3}Co_{1/3}Mn_{1/3}O_2$ or $LiNi_{0.5}Co_{0.2}Mn_{0.3}O_2$), lithium nickel cobalt manganese aluminum oxide, lithium nickel cobalt aluminum oxide, lithium titanate, metallic lithium, lithium metal oxide, lithium cobalt oxide, lithium manganese oxides (LMO) (e.g., $LiMn_2O_4$ and $LiNi_{0.5}Mn_{1.5}O_4$), lithium iron phosphates (LFP) (e.g., $LiFePO_4$), $LiMnPO_4$, $LiCoPO_4$ (LCP), $Li_2MMnO_8$, wherein M is Fe and/or Co, layered Li—Ni—Co—Mn oxides, (NCM), layered Li—Ni—Co—Al oxides (NCA), and the like. Combinations of these and/or other compounds are also possible.

As a non-limiting example, the cathode may comprise a positive electroactive material that contains various amounts of lithium, nickel, manganese, and cobalt. These may vary independently of each other, e.g., in the formula $Ni_xMn_yCo_z$. In some cases, the sum of x, y, and z is 1, i.e., there are no other ions present within the NMC matrix composition (other than the alkali metal ions, e.g., lithium) other than these three. Thus, z may equal (1−x−y). However, in other cases, the sum of x, y, and z may actually be less than or more than 1, e.g., from 0.8 to 1.2, from 0.9 to 1.1, from 0.95 to 1.05, or from 0.98 to 1.02. Additional example values are discussed below. Thus, the material may be overdoped or underdoped in some cases, and/or contain other ions present in addition to nickel, manganese, and cobalt.

As an example, the positive electroactive material may have a formula of $Li_a(Ni_xMn_yCo_z)O_2$. In some cases, a is a numerical value in a first range between approximately 1.00 and 1.01, x is a numerical value in a second range between approximately 0.34 and 0.58, y is a numerical value in a third range between approximately 0.21 and 0.38, and z is a numerical value in a fourth range between approximately 0.21 and 0.38. Additional example values for each of a, x, y, and z are discussed below.

In another set of embodiments, the positive electroactive material can comprise an electroactive composition that comprises lithium (Li), nickel (Ni), manganese (Mn), and cobalt (Co). The positive electroactive material can further include an element M selected from samarium (Sm), lanthanum (La), zinc (Zn) or combinations thereof. In some embodiments, the composition can have a formula of $Li_aMb(Ni_xMn_yCo_z)_{1-b}O_2$. In some cases, a may be a numerical value in a first range between approximately 1.00 and 1.01, b is a numerical value in a second range between approximately 0 and 0.08, x is a numerical value in a third range between approximately 0.34 and 0.58, y is a numerical value in a fourth range between approximately 0.21 and 0.38, and z is a numerical value in a fifth range between approximately 0.21 and 0.38. Additional example values for each of a, b, x, y, and z are discussed below.

In any of the structures described above or herein, in some cases, x (e.g., nickel) may be at least 0.5, at least 0.55, at least 0.6, at least 0.65, at least 0.7, at least, 0.75, at least 0.8, at least 0.85, at least 0.9, at least 0.95, etc. In some embodiments, x may be no more than 0.95, no more than 0.9, no more than 0.85, no more than 0.8, no more than 0.75, no more than 0.7, no more than 0.65, no more than 0.6, no more than 0.55, no more than 0.5, etc. In certain embodiments, combinations of any these are possible. For example, x may be between 0.7 and 0.9.

In some cases, y (e.g., manganese) may be at least 0.05, at least 0.1, at least 0.15, at least 0.2, at least 0.25, at least 0.3, at least 0.35, at least 0.4, at least 0.45, at least 0.5, etc. In some embodiments, y may be no more than 0.5, no more than 0.45, no more than 0.4, no more than 0.35, no more than 0.3, no more than 0.25, no more than 0.2, no more than 0.15, no more than 0.1, no more than 0.05, etc. In certain embodiments, combinations of any these are possible. For example, y may be between 0.05 and 0.15.

In some cases, z (e.g., cobalt) may be at least 0.05, at least 0.1, at least 0.15, at least 0.2, at least 0.25, at least 0.3, at least 0.35, at least 0.4, at least 0.45, at least 0.5, etc. In some embodiments, z may be no more than 0.5, no more than 0.45, no more than 0.4, no more than 0.35, no more than 0.3, no more than 0.25, no more than 0.2, no more than 0.15, no more than 0.1, no more than 0.05, etc. In certain embodiments, combinations of any these are possible. For example, z may be between 0.05 and 0.15.

In some cases, a (e.g., lithium) may be at least 0.95, at least 0.96, at least 0.97, at least 0.98, at least 0.99, at least 1.00, at least 1.01, at least 1.02, at least 1.03, at least 1.04, at least 1.05, etc., and/or no more than 1.05, no more than 1.04, no more than 1.03, no more than 1.02, no more than 1.01, no more than 1.00, no more than 0.99, no more than 0.98, no more than 0.97, no more than 0.96, no more than 0.95, etc. Combinations of any of these may also be possible, e.g., a may be between 0.99 and 1.03.

In some cases, b may be at least 0.01, at least 0.02, at least 0.03, at least 0.04, at least 0.05, at least 0.06, at least 0.07, at least 0.08, at least 0.09, at least 0.1, etc. In some embodiments, b may be no more than 0.1, no more than 0.09, no more than 0.08, no more than 0.07, no more than 0.06, no more than 0.05, no more than 0.04, no more than 0.03, no more than 0.02, no more than 0.01. b may also be 0 in some cases. Combinations of any of these may also be possible, e.g., a may be between 0.07 and 0.09.

Additional examples of positive electroactive materials can be seen in Int. Pat. Apl. Pub. No. WO 2018/112182, entitled "Electroactive Material for Lithium-Ion or other Batteries," or Int. Pat. Apl. Pub. No. WO 2017/053275, entitled "Nickel-Based Positive Electroactive Materials," each of which is incorporated herein by reference in its entirety.

In another aspect, the present disclosure generally relates to methods of making electrolytes such as those discussed herein. For example, in one set of embodiments, a solid electrolyte may be prepared by mixing a liquid electrolyte and a polymer precursor into a cell, and solidifying the liquid electrolyte within the cell to form a solid electrolyte. The electrolyte and the polymer precursor may be as discussed herein. For example, the electrolyte may comprise a lithium salt and an ion dissociation compound. In some cases, a liquid electrolyte and a monomer or polymer may be mixed in a liquid phase, and introduced into a pre-assembled cell. Solidification within the cell may occur based on thermal gelation, physical gelation, polymerization, cross-linking, or the like, e.g., to form a solid electrolyte within the cell.

In some cases, a polymer may be produced by reacting various monomers together. Non-limiting examples of monomers include different combinations of the structures described herein, for example, methacrylate monomers with different ester groups, such as norbornyl methacrylate. Other examples of esters include, but are not limited to, methyl methacrylate, ethyl methacrylate, butyl methacrylate, 2-aminoethyl methacrylate hydrochloride, glycidyl methacrylate, 2-(diethylamino)ethyl methacrylate, etc.

In some cases, an initiator may be present, e.g., to facilitate polymerization. For example, the initiator may include a chemical initiator, such as Irgacure initiator, 2,2'-azobis(2-methylpropionitrile), ammonium persulfate, or other initiators known to those of ordinary skill in the art. In some cases, the initiator may be added to have a mole fraction between 0.001 and 0.01, or other suitable mole fractions to facilitate polymerization.

In one set of embodiments, the polymer may be mixed with a solvent to form a slurry, which can be cured to form a solid. In addition, in some cases, more than one polymer may be present in the slurry, e.g., a first polymer and a second polymer, which may be added to the slurry sequentially, simultaneously, etc. The polymers may each independently be polymers such as those described herein, and/or other suitable polymers.

Non-limiting examples of suitable solvents include solvents such as water (e.g., distilled water), methanol, ethanol, or other aqueous solvents. Other examples of solvents include organic solvents such as pyridine, chloroform, or the like. In some cases, more than one such solvent may be present. In addition, after formation of the slurry, the solvent may be removed, e.g., via techniques such as evaporation.

In addition, in some cases, a plasticizer may be present as well, e.g., such as succinonitrile, ethylene carbonate, sulfolane, trimethyl phosphate, or the like. In addition, in some embodiments, an electrolytic salt may also be present, for example, an alkali metal salt, such as lithium or sodium. Specific non-limiting examples of lithium salts include LiTFSI, LiFSI, LiBOB, $LiPF_6$, $LiBF_4$, $LiClO_4$, $LiAsF_6$, $LiN(CF_3SO_2)_2$, $LiC(CF_3SO_2)_3$, LiDFOB, LiF, LiCl, LiBr, LiI, $Li_2SO_4$, $LiNO_3$, $Li_3PO_4$, $Li_2CO_3$, LiOH, lithium acetate, lithium trifluoromethyl acetate, lithium oxalate, etc., or other salts such as those described herein.

In some embodiments, the slurry may be cured to form a film, such as a solid-state film. For instance, the mixture can be formed into a film by curing, for example, using UV light, thermoforming, exposure to elevated temperatures, or the like. For example, curing may be induced using exposure to UV light for at least 3 min, at least 5 min, at least 10 min, at least 15 min, etc., and/or by exposure to temperatures of at least 20° C., at least 30° C., at least 40° C., at least 50° C., at least 60° C., at least 70° C., at least 80° C., at least 90° C., at least 100° C., etc. As an example, a slurry may be coated or positioned on a surface and/or within a mold, and exposed to UV light to cause the polymer to cure.

In addition, in some cases, during the curing process, at least some of the polymers may also cross-link, e.g., as discussed herein, which in some cases may improve mechanical properties and/or electrochemical performance. For example, exposure to UV light may facilitate the cross-linking process. As another example, thermal crosslinking may be used.

Additional discussion of electrolyte fabrication may be seen in Int. Pat. Apl. Pub. No. WO 2018/112182, entitled "Electroactive Material for Lithium-Ion or other Batteries," or Int. Pat. Apl. Pub. No. WO 2017/053275, entitled "Nickel-Based Positive Electroactive Materials," each incorporated herein by reference in its entirety for all purposes.

The following documents are incorporated herein by reference in their entireties: Int. Pat. Ser. Apl. No. PCT/US16/52627, entitled "High Performance Nickel-Based Positive Electroactive Material for a Lithium-Ion Battery," published as Int. Pat. Apl. Pub. No. WO 2017/053275; Int. Pat. Apl. Ser. No. PCT/US17/66381, entitled "Electroactive Materials for Lithium-Ion Batteries and Other Applications," published as Int. Pat. Apl. Pub. No. WO 2018/112182; Int. Pat. Apl. Ser. No. PCT/US18/18986, entitled "Core-Shell Electroactive Materials," published as Int. Pat. Apl. Pub. No. WO 2018/156607; U.S. patent application Ser. No. 16/037,041, entitled "Ionomer Electrode Manufacturing Slurry," published as U.S. Pat. Apl. Pub. No. 2019/0020033; U.S. patent application Ser. No. 16/059,251, entitled "Poly(Lithium Acrylate) and Other Materials for Membranes and Other Applications," published as U.S. Pat. Apl. Pub. No. 2019/0051939; U.S. patent application Ser. No. 16/240,502, entitled "Polymer Solid Electrolyte"; and a U.S. patent application filed on even date herewith, entitled "Electrodes for Lithium-Ion Batteries and Other Applications."

The following examples are intended to illustrate certain embodiments of the present invention, but do not exemplify the full scope of the invention.

EXAMPLE 1

This example provides a description of a safe electrolyte in accordance with some embodiments of the present disclosure. This example also provides examples of making and charactering such an electrolyte.

The electrolyte was obtained by mixing an ion dissociation compound trimethyl phosphate, lithium salts (lithium bis(trifluoromethanesulfonyl)imide, LiTFSI) and additive in the ratios described in Table 1 by mechanical stirring at room temperature in the liquid state. Details of the lithium salt and additive are listed in Table 1.

Figure 2:
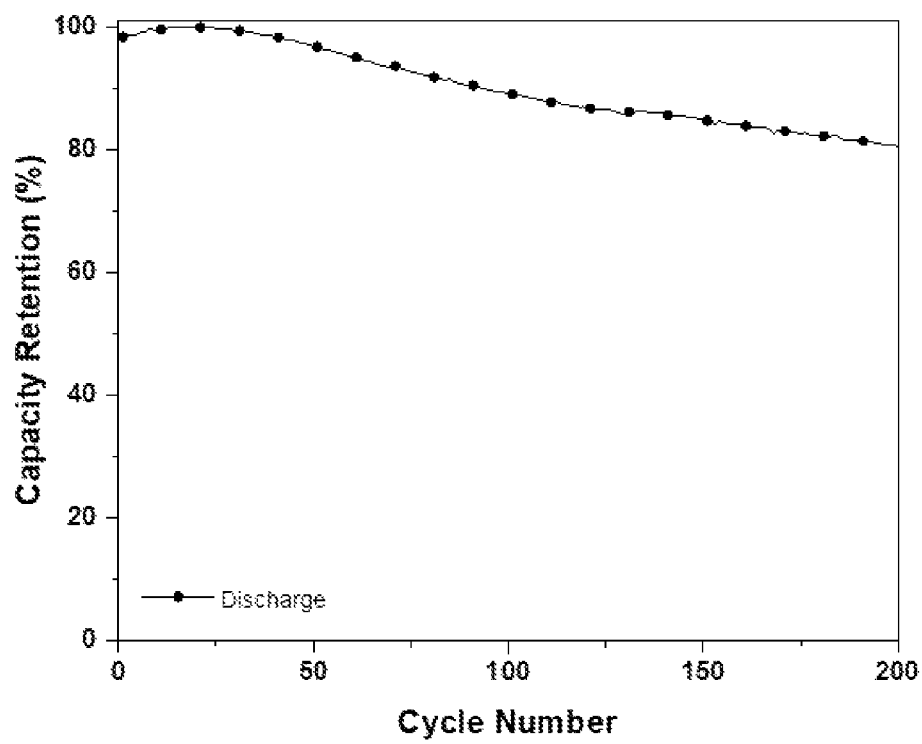
FIG. 2 illustrates cycling performance curves of an electrolyte according to some embodiments of the disclosure.

Cycling performance: The electrolyte was assembled in a 2032-coin cell with lithium foil as the anode, NMC811 as cathode (2 mAh/cm$^2$), a commercial Celgard separator as the separator, with electrolytes based on carbonate esters for comparison. The cycling test was performed with a Neware cycling tester. The charge/discharge voltage window was from 2.8 V to 4.5 V. FIG. 2 illustrates the capacity retention of Example 1-1 after 100 cycles at current rate of 0.5 C. The test data is list in Table 1.

Safety: Test Protocol: This test used penetration by a 3 mm stainless steel nail with a penetration speed of approximately 80 mm/sec. The penetration was perpendicular to the flat face (largest surface area face) of the cell. The cell was instrumented for voltage and surface temperature, both of which were logged at an appropriate interval. FIG. 1 illustrates the voltage profile and thermal profile of Example 1-1.

Measurement Equipment & Calibration Data: MY44056108, Datalogger, Agilent 34970A, Last Cal May 18, 2018, Cal Due May 18, 2019.

Pre-Test Information and Data: 1 Ah Pouch Cell was fully charged from 2.8 V to 4.5 V, the nail speed (80 mm/sec) was programmed into the actuator.

In-Test Information and Data: ambient temperature: 20.4 ° C., ambient humidity: 35%.

TABLE 1

| Example | Ion dissociation compound | Additive (Percentage) | Li salt | Li salt Concentration | Capacity Retention (100 cycles) |
| --- | --- | --- | --- | --- | --- |
| Example 1-1 | Trimethyl phosphate | 1,2-dimethoxyethane (20%) | LiTFSI | 0.8M | 80% |
| Example 1-2 | Trimethyl phosphate | Tetraethylene glycol dimethyl ether (10%) | LiTFSI | 1.0M | 75% |
| Example 1-3 | Trimethyl phosphate | Fluoroethylene carbonate (30%) | LiTFSI | 1.2M | 83% |
| Comparison Example 1 | EC/DEC | N/A | LiPF$_6$ | 1M | 40% |

Comparison Example 1 used a conventional carbonate electrolyte of 1.0 M lithium hexafluorophosphate (LiPF$_6$) in a mixture of ethylene carbonate (EC) and diethyl carbonate (DEC) (3:7 by weight). It is highly flammable.

In Examples 1-1, 1-2, 1-3, the electrolytes used LiTFSI, a flame-retardant trimethyl phosphate. According to FIG. 1, the temperature of the sample increased up to 70.6° C. without any fire or explosion, illustrating that the electrolyte was highly stable with both Li metal anodes and high-voltage cathodes. Thus, the electrolyte was highly stable and safe, and could be used in systems such as high-energy-density Li metal batteries (LMBs). The introduction of the flame retardant trimethyl phosphate could potentially prevent fire and explosion due to the excessive rise of temperature in the battery, making the electrolyte nonflammable, and thus improving the safety of the battery. The low flammable electrolyte could provide enhanced safety for lithium metal and lithium ion batteries. The electrolytes could also be used in LIBs and other batteries to largely improve their safety and cyclability.

In addition, different additives were used to further improve the cycling performance. For example, in Example 1-1, 20 vol % 1,2-dimethoxyethane was introduced; in Example 1-2, 10 vol % tetraethylene glycol dimethyl ether was introduced; and in Example 1-3, 30 vol % fluoroethylene carbonate was introduced. Based on the test results in Table 1 and FIG. 2, the electrolyte allowed stable cycling of the Li metal anode (LMA), and greatly enhanced the cycling performance of Li/NMC811 batteries (>83% capacity retention after 100 cycles at 0.5 C). Without wishing to be bound by any theory, the excellent electrochemical performance of the electrolyte was believed to be due to the enhanced stability between the LMA and the well-reserved locally concentrated $Li^+$-$FSI^-$-TEP solvation structures, as well as the improved interfacial reaction kinetics.

Moreover, different Li salts at different concentration in trimethyl phosphate can used to prepare such electrolyte. For example, the salt concentration in the electrolytes can be from 0.5 M to 7 M.

EXAMPLE 2

This example illustrates an electrolyte. The electrolyte was obtained by mixing an ion dissociation compound dimethyl sulfone, additive and lithium salts (lithium bis(trifluoromethanesulfonyl)imide, LiTFSI), in the ratios described in Table 2 by mechanical stirring at room temperature in the liquid state. Electrochemical stabilities and cycling performance were determined. The test data is listed in Table 2.

Figure 3:
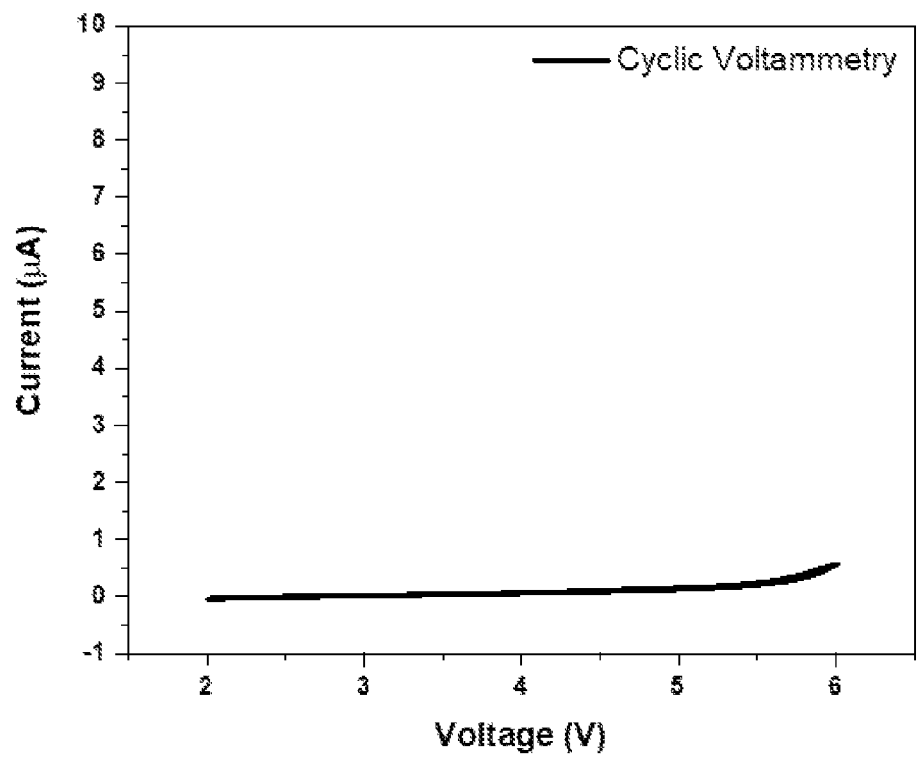
FIG. 3 illustrates electrochemical stability curves of an electrolyte in accordance with certain embodiments of the disclosure.

Electrochemical stability (oxidation potential) testing was performed using cyclic voltammetry measurements with an AC impedance analyzer (Interface 1010E Potentiostate, Gamry). Samples with an area of 1.54 $cm^2$ were sealed between stainless-steel plate and lithium foil (reference electrode), with commercial electrolytes based on carbonate esters for comparison. The charge/discharge window range was from 2.8 to 6.0 V with a scan rate of 10 mV/s. The test was conducted at room temperature. FIG. 3 illustrates the electrochemical stability curves of the electrolyte of Example 2-4.

Cycling performance: The measurement methods and conditions were similar to Example 1. Each cell was charged and discharged for 200 cycles.

electrolyte. According to the test data of the electrochemical stability in Table 2 and FIG. 3, the introduction of the dimethyl sulfone can improve performance of the electrolyte.

For example, in one aspect, the electrolytes exhibited higher oxidation potentials (>5.0 V) than the comparison examples, illustrating that the electrolytes were very stable at high voltages, making them useful for high voltage lithium ion cathode materials, such as $LiNi_{0.5}Mn_{1.5}O_4$.

In another aspect, the electrolytes exhibited a SET (self-extinguishing time) of <6 s $g^{-1}$, illustrating that the electrolytes were relatively non-flammable, and that the safety of the electrolytes was improved. (See below for additional details regarding this test.)

In yet another aspect, the electrolytes exhibited stability toward lithium metal, illustrating that the electrolytes were highly stable with Li metal anodes, making the electrolyte highly stable and safe for use in high-energy-density Li metal batteries (LMBs). When dimethyl sulfone was used in combination with lithium bis(fluorosulfonyl)imide (LiFSI), a highly conductive lithium salt with an anion that has strong tendency to donate fluorine, the electrolytes exhibited synergistic interphase formation mechanisms (CEI/SEI). Together, these interphases allowed stable coupling of a Li metal anode and a high-voltage cathode over an extended temperature range.

Different additives were also used to further improve cycling performance. In Example 2-2, 5 vol % 1,2-dimethoxyethane was introduced; in Example 2-3, 15 vol % tetraethylene glycol dimethyl ether was introduced; and in Example 2-4, 15 vol % fluoroethylene carbonate was introduced. As shown in Table 2, the additives helped to enhance the cycling performance of Li/NMC811 batteries (>82% capacity retention after 200 cycles at 0.5 C). Without wishing to be bound by any theory, the excellent electrochemical performance of the electrolyte was believed to be due to the enhanced stability between the LMA and the well-reserved locally concentrated $Li^+$-$FSI^-$-TEP solvation structures, as well as the improved interfacial reaction kinetics.

Moreover, different Li salts at different concentration in trimethyl phosphate can used to prepare such electrolyte. For example, the salt concentration in the electrolytes can be from 0.5 M to 7 M.

TABLE 2

| Example | Ion dissociation compound | Additive (Volume Percentage) | Li salt | Li salt Concentration | Oxidation Potential vs. Li/Li+ (V) | Capacity Retention (%) (200 cycle 0.5 C) |
|---|---|---|---|---|---|---|
| Example 2-1 | Dimethyl Sulfone | None | LiTFSI | 0.8M | 5.5 V | 60% |
| Example 2-2 | | 1,2-dimethoxyethane (5%) | LiTFSI | 1.0M | 5.0 V | 72% |
| Example 2-3 | | Tetraethylene glycol dimethyl ether (15%) | LiTFSI | 1.2M | 5.1 V | 77% |
| Example 2-4 | | Fluoroethylene carbonate (5%) | LiTFSI | 1.8M | 5.5 V | 82% |
| Comparison Example 1 | EC/DEC | N/A | $LiPF_6$ | 1M | 4.2 V | 40% |

Compared with Comparison Example 1, in Example 2, dimethyl sulfone was introduced. Dimethyl sulfone is a highly polar aprotic solvent ion dissociation compound with high thermal and voltage stability windows when used in the

EXAMPLE 3

Example 3-1 to Example 3-4: Examples 3-1 through 3-4 illustrate an electrolyte. The electrolyte was obtained by mixing a dissociation compound diethyl sulfone, a certain concentration of lithium salts (lithium bis(trifluoromethanesulfonyl)imide, LiTFSI) (0.5 M in Examples 3-1 and 3-3, and 3 M in Example 3-2 and 3-4), 0.5 wt % additive (vinylene carbonate, VC, in Example 3-1 and 3-2, and fluoroethylene carbonate, FEC, in Example 3-3 and 3-4) by mechanical stirring at room temperature in the liquid state.

Example 3-5 to Example 3-12. Examples 3-5 to 3-12 illustrate a polymer solid electrolyte based on sulfur containing ion dissociation compound. The polymer solid electrolyte was obtained by mixing a polymer (10% in Examples 3-5 and 3-6, 20% in Examples 3-7 through 3-12), 1 wt % AIBN as initiator, a dissociation compound (diethyl sulfone), a certain concentration of lithium salts (lithium bis(trifluoromethanesulfonyl)imide, LiTFSI) (0.5 M in Examples 3-5, 3-7, 3-9, and 3-11; 3 M in Examples 3-6, 3-8, 3-10, and 3-12), 0.5 wt % additive (vinylene carbonate, VC, in Examples 3-9 and 3-10; fluoroethylene carbonate, FEC, in Examples 3-11 and 3-12; and no additive in Examples 3-5, 3-6, 3-7, and 3-8) by mechanical stirring at room temperature in a liquid state. The polymer had the structure shown below. Synthesis of the polymer was described in Example 5 of U.S. Provisional Patent Application Ser. No. 62/757,133 (incorporated herein by reference in its entirety).

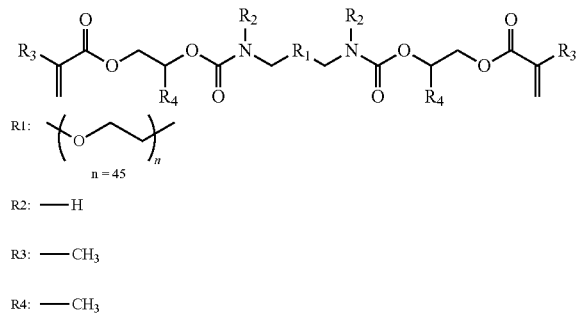

R1: $\left(\text{O}\right)_n$ n = 45

R2: —H

R3: —$CH_3$

R4: —$CH_3$

Comparison Example 3-1, 3-2, and 3-3. Comparison Example 3-1 used a commercial electrolytes based on carbonate esters, with 1 M lithium hexafluorophosphate (LiPF$_6$) in a mixture of ethylene carbonate (EC) and diethyl carbonate (DEC) (1:1 by weight).

Comparison Examples 3-2 and 3-3 were electrolytes based on conventional carbonate. The electrolytes were obtained by mixing the polymer (the same as the polymer in Examples 3-5 to 3-12), 1% initiator azobisisobutyronitrile (AIBN), and 1 M lithium hexafluorophosphate (LiPF$_6$) in a mixture of ethylene carbonate (EC) and diethyl carbonate (DEC) (1:1 by weight). The concentration of the polymer in Comparison Example 3-2 was 10 wt %, and the concentration of the polymer in Comparison Example 3-3 was 20 wt %, The mixtures in Examples 3-5 to 3-12 and Comparison Examples 3-2 and 3-3 were each applied to a PET thin film. In particular, a solid-state electrolyte film was obtained by UV-curing for 5 min. Electrochemical stabilities, electrochemical impedance spectroscopy, cycling performance, and safety performance were determined. The test data is listed in Table 3.

Electrochemical stability. The measurement methods and conditions were similar to Example 2.

Electrochemical Impedance Spectroscopy. Electrochemical impedance spectroscopy testing was performed by AC impedance analyzer (Interface 1010E Potentiostate, Gamry). The samples with an effective area of 1 cm$^2$ were placed in 2032 coin-type cells. The ionic conductivity was measured in the frequency range of 1 MHz to 1 Hz by a bias voltage of 10 mV. The ionic conductivity was calculated with the known thickness and area the membrane.

Cycling performance. The electrolytes were tested in an electrochemical cell with NCM811 as cathode, and graphite as anode. The measurement methods and conditions were similar to Example 1.

Self-extinguishing time (SET). A liquid sample is used. The liquid sample can be either immobilized in a porous carrier material or placed directly on a dish. The time between the removal of a gas flame and flame self-extinguishment was determined. SET is reported in seconds per gram of sample. The sample can be determined to be "non-flammable" if the SET is less than 6 s g$^{-1}$, "flame-retarded" if the SET is between 6 s g$^{-1}$ and 20 s g$^{-1}$, and "flammable" if the SET is greater than 20 s g$^{-1}$.

TABLE 3

| Example | Ionic Conductivity (S/cm) | Oxidation Potential vs. Li/Li$^+$ (V) | Flash Point (° C.) | Coin Cell 0.5 C Capacity (mAh/g) | Cycling | Working Temperature (° C.) |
|---|---|---|---|---|---|---|
| Example 3-1 | 3.2 × 10$^{-4}$ | >5.0 | >170 | 80 | >300 | >85 |
| Example 3-2 | 2.8 × 10$^{-4}$ | | | 185 | | |
| Example 3-3 | — | | | 112 | | |
| Example 3-4 | 2.8 × 10$^{-4}$ | | | 175 | | |
| Example 3-5 | 1.4 × 10$^{-4}$ | >4.5 | | — | >200 | |
| Example 3-6 | 0.8 × 10$^{-4}$ | | | 156 | | |
| Example 3-7 | 1.2 × 10$^{-4}$ | | | — | | |
| Example 3-8 | 0.7 × 10$^{-4}$ | | | 151 | | |
| Example 3-9 | 0.8 × 10$^{-4}$ | | | — | | |
| Example 3-10 | 0.7 × 10$^{-4}$ | | | 162 | | |
| Example 3-11 | 0.8 × 10$^{-4}$ | | | — | | |
| Example 3-12 | 0.7 × 10$^{-4}$ | | | 152 | | |
| Example 3-10 (tested at 85° C.) | 1.1 × 10$^{-4}$ | >4.5 | >170 | 169 | >200 | >85 |
| Comparison Example 3-1 | 1.2 × 10$^{-4}$ | <4.4 | <70 | 95 | poor | <40 |
| Comparison Example 3-2 | 0.6 × 10$^{-4}$ | | | 88 | | |
| Comparison Example 3-3 | 0.7 × 10$^{-4}$ | | | 72 | | |

Figure 4:
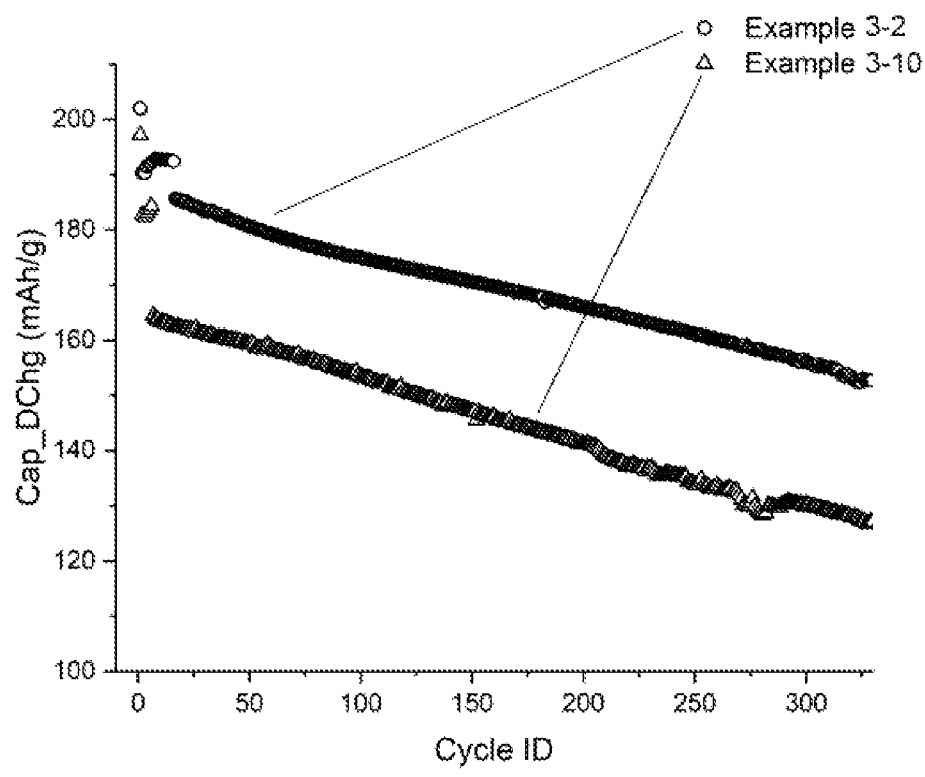
FIG. 4 illustrates cycling performance curves of an electrolyte in accordance with other embodiments of the disclosure.

Examples 3-1 to 3-12 were tested at room temperature. Example 3-10 was also re-tested at 85° C. FIG. 4 illustrates an example comparing the performance of Example 3-2 and 3-10.

In Examples 3-1 to 3-13, an ion dissociation compound was introduced. The ion dissociation compound was a highly polar aprotic compound, with high thermal and voltage stability windows when used in an electrolyte. According to the test data shown in Table 3, the introduction of an ion dissociation compound can improve various performances of the electrolyte.

For example, in one aspect, the electrolytes exhibited higher oxidation potentials (>5.0 V) than the comparison examples, illustrating that the electrolytes were very stable at high voltages, making them useful for high voltage lithium ion cathode materials, such as $LiNi_{1.0}5Mn_{1.5}O_4$.

In another aspect, the electrolytes exhibited higher flash points (>170° C.), and SETs (self-extinguishing time) of <6 s $g^{-1}$, illustrating that the electrolyte was relatively non-flammable, and that the safety of the electrolytes was improved.

In another aspect, the electrolytes exhibited better galvanostatic cycling performance (cycle >300, capacity of 185 mAh/g) in an electrochemical cell at higher working temperatures (>85° C.) than the comparison examples. This illustrates that the electrolytes were highly stable at high temperatures, making it a good candidate for high temperature lithium batteries. The electrolytes also exhibited acceptable stability toward graphite anode, suggesting that the electrolytes were highly stable and safe for Li batteries. When the ion dissociation compound was used in combination with lithium bis(trifluoromethanesulfonyl)imide (LiTFSI), a highly conductive lithium salt with an anion that had strong tendency to donate fluorine, the electrolytes exhibited synergistic interphase formation mechanisms (CEI/SEI). Together, these interphases allowed stable coupling of a graphitic anode and a high-voltage cathode over an extended temperature range.

Unlike Examples 3-5 to 3-13, in Examples 3-1 through 3-4, 5 wt % or 10 wt % polymer was introduced in the liquid electrolyte, formed polymer solid electrolytes. The gel polymer electrolyte exhibited properties between those of liquid and solid electrolytes in terms of the ionic conductivity and physical phase. From the test data in Table 3, liquid-level ionic conductivity was achieved if the physical integrity of polymer solid electrolytes was facilitated by using polymers. Problems such as electrolyte leakage and flammability could be mitigated by using gel polymer electrolyte in electrochemical cells.

Unlike Comparison Example 3-1, in Examples 3-11 through 3-14, vinylene carbonate (VC) or fluoroethylene carbonate (FEC) was introduced in the liquid electrolytes. Unlike Examples 3-9 to 3-13, in Examples 3-5 to 3-8, VC or FEC was introduced in the polymer solid electrolytes. The introducing of additives, such as VC or FEC, could improve wetting process for battery manufacture and testing. Some additives, such as VC or FEC, were able to preferentially break down and undergo polymerization and ion-exchange reactions at the anode/electrolyte interface to produce SEIs with desirable chemical compositions and physical properties. For example, in a Li battery, a stable SEI may be able to accommodate the cyclic volume changes at the anode during charge (addition) and discharge (removal) of metal atoms to the electrode, which is good for stable long-term cell operation.

In summary, the introducing of flame retardant and/or sulfones appeared to considerably improve various electrochemical performances. These electrolytes may help to achieve safe, long-life lithium secondary batteries. The electrolytes in these experiments exhibited better oxidation potential than the comparative materials, which suggests they may be suitable for high voltage cathode materials. The improved oxidation potential of the electrolytes can also provide enhanced stability in both liquid electrolytes and solid electrolytes, which may provide longer life and/or higher voltage lithium batteries. In addition, the electrolyte in these examples exhibited higher flash points and were highly stable at higher temperature, suggesting that they may be useful for high temperature lithium batteries as well as other applications. These properties may also benefit the charging/discharging rate performances of lithium ion batteries.

EXAMPLE 4

The experiments described in this example use the procedures from Examples 1 and 2, except modified as noted below.

Examples 4-1 to 4-4 provide testing information regarding to the salt concentration. With increased amount of LiTFSI in dimethyl sulfone, assembled Li metal coin cells showed better cycling stability with capacity retention improved from 60% to 65% at 200 cycles.

Example 4-5 to 4-10 provide the effectiveness of additives, including ethylene glycol and carbonate based derivatives.

Example 4-2 and 4-11 showed LiTFSI is a better salt than $LiPF_6$.

Example 4-12 and 4-13 provided alternative sulfone derivatives as ion dissociation compound for Li metal battery.

Results are provided in Table 4. It was found that commercial electrolytes had low electrochemical stability, and low cycling stability towards the Li metal anode. In contrast, dimethyl sulfone-based electrolytes provided higher oxidation potential, and better cycling performance in Li metal cells than commercial electrolytes. Also, the addition of ethylene glycol provided better cycling performance due to the decomposition of ethylene glycol and formed an SEI (solid electrolyte interphase). In some cases, the addition of fluoroethylene carbonate may provide better cycling performance due to the decomposition of fluoroethylene carbonate and an SEI was formed. Also, the addition of trimethyl phosphate (a flame retardant) improved the safety of the battery.

The polymer used in Example 4-14 was as follows. It also included 40-60% of dimethyl sulfone and 30-50% of triethyl phosphate.

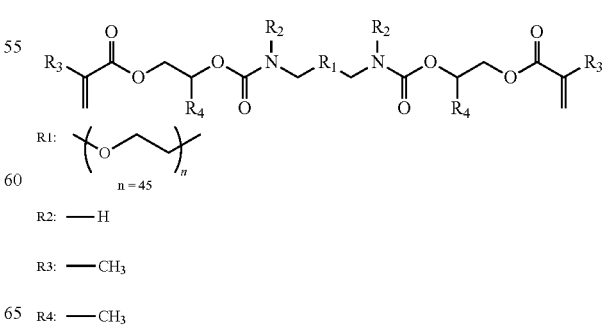

TABLE 4

| Example | Ion dissociation compound | Ion dissociation compound (Volume Percentage) | Li salt | Additives (Volume Percentage) | Li salt Concentration | Oxidation Potential vs. Li/Li+ (V) | Capacity Retention (%) (200 cycle 0.5 C) |
|---|---|---|---|---|---|---|---|
| Example 4-1 | Dimethyl Sulfone | 100% | LiTFSI | — | 0.8M | 5.5 V | 60% |
| Example 4-2 | | 100% | LiTFSI | — | 1.0M | 5.5 V | 60% |
| Example 4-3 | | 100% | LiTFSI | — | 1.2M | 5.5 V | 62% |
| Example 4-4 | | 100% | LiTFSI | — | 1.8M | 5.5 V | 65% |
| Example 4-5 | | 95% | LiTFSI | 1,2-dimethoxyethane (5%) | 1.8M | 5.1 V | 74% |
| Example 4-6 | | 85% | LiTFSI | Tetraethylene Glycol dimethyl ether (15%) | 1.8M | 5.2 V | 81% |
| Example 4-7 | | 92% | LiTFSI | Fluoroehtylene Carbonate (8%) | 1.8M | 5.5 V | 85% |
| Example 4-8 | | 60% | LiTFSI | Trimethyl Phosphate (40%) | 1.8M | 5.3 V | 82% |
| Example 4-9 | | 60% | LiTFSI | Triethyl Phosphate (40%) | 1.8M | 5.2 V | 80% |
| Example 4-10 | | 55% | LiTFSI | Trimethyl Phosphate (40%) Fluoroethylene Carbonate (5%) | 1.8M | 5.3 V | 85% |
| Example 4-11 | | 100% | LiPF6 | — | 1.0M | 4.9 V | 54% |
| Example 4-12 | Diethyl Sulfone | 100% | LiTFSI | — | 1.0M | 5.2 V | 52% |
| Example 4-13 | Ethyl methyl Sulfone | 100% | LiTFSI | — | 1.0M | 5.1 V | 54% |
| Example 4-14 | Dimethyl Sulfone | 55% | LiTFSI | Trimethyl Phosphate (40%) Fluoroethylene Carbonate (5%) 10 wt % Polymer | 1.8M | 5.0 V | 80% |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A polymer solid electrolyte synthesized by crosslinking a mixture comprising a lithium salt, a crosslinkable monomer, a flame retardant as ion dissociation compound, and a carbonate additive that can enhance capacity retention of an electrochemical device, wherein the crosslinkable monomer has a formula of:

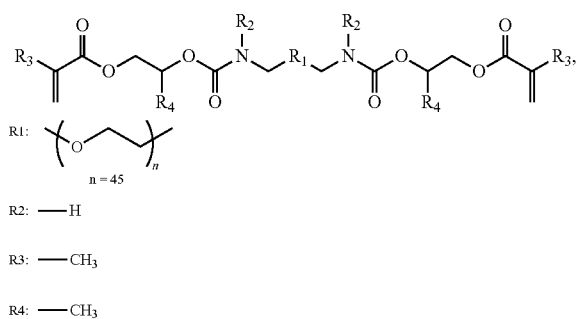

R2: —H

R3: —CH$_3$

R4: —CH$_3$ wherein the volume ratio of the additive to the ion dissociation compound is between 5/95 and 50/50 and the polymer solid electrolyte has an oxidation potential of at least 4.5 V with reference to Li/Li+.

2. The polymer solid electrolyte of claim 1, wherein the lithium salt is selected from the group consisting of LiTFSI, LiFSI, LiBOB, LiPF$_6$, LiBF$_4$, LiClO$_4$, LiAsF$_6$, LiN(CF$_3$SO$_2$)$_2$, LiC(CF$_3$SO$_2$)$_3$, LiDFOB, LiF, LiCl, LiBr, LiI, Li$_2$SO$_4$, LiNO$_3$, Li$_3$PO$_4$, Li$_2$CO$_3$, LiOH, lithium acetate, lithium trifluoromethyl acetate, and lithium oxalate.

3. The polymer solid electrolyte of claim 1, wherein the lithium salt has a concentration ranging from 0.5 M to 7 M in the mixture.

4. The polymer solid electrolyte of claim 1, wherein the carbonate additive is selected from the group consisting of 1,2-dimethoxyethane carbonate, ethylene carbonate (EC), vinylene carbonate (VC), fluoroethylene carbonate (FEC) and methylene ethylene carbonate.

5. The polymer solid electrolyte of claim 1, wherein the flame retardant is a nitrogen-containing flame retardant, silicon-containing flame retardant, fluorine-containing flame retardant, an organophosphorus flame retardant or a combination thereof.

6. The polymer solid electrolyte of claim 1, wherein the flame retardant is selected from the group consisting of methyl difluoroacetate, difluoroethyl acetate, trimethyl phosphate, triethyl phosphate, and a mixture thereof.

7. The polymer solid electrolyte of claim 1, wherein the crosslinkable monomer has a concentration ranging from 5 wt % to 40 wt % in the mixture.

8. The polymer solid electrolyte of claim 1, wherein the mixture for synthesizing the polymer solid electrolyte comprises an initiator.

9. The polymer solid electrolyte of claim 8, wherein the initiator is selected from the group consisting of benzoyl peroxide, 2,2'-azobisisobutyronitrile (AIBN), 4,4-azobis(4-cyanovaleric acid) (ACVA), potassium persulfate, and ammonium persulfate.

10. The electrochemical device of claim 1, wherein the mixture for synthesizing the polymer solid electrolyte further comprises a phosphate additive.

11. The electrochemical device of claim 10, wherein the phosphate additive is selected from the group consisting of trimethyl phosphate and triethyl phosphate.

12. An electrochemical device comprising the polymer solid electrolyte of claim 1.

13. The electrochemical device of claim 12 further comprising an anode.

14. The electrochemical device of claim 13, wherein the anode comprises lithium metal.

15. The electrochemical device of claim 13, wherein the anode comprises graphite.

16. The electrochemical device of claim 12 further comprising a cathode.

17. The electrochemical device of claim 16, wherein the cathode comprises an electroactive material selected from the group consisting of lithium nickel cobalt manganese oxide, lithium nickel cobalt aluminum oxide, lithium titanate, metallic lithium, lithium metal oxide, lithium manganese oxide, lithium cobalt oxide, and lithium iron phosphate.

* * * * *